US010526233B2

(12) United States Patent
Thomas et al.

(10) Patent No.: US 10,526,233 B2
(45) Date of Patent: Jan. 7, 2020

(54) APPARATUS AND METHOD FOR SHAPING OR FORMING HEATED GLASS SHEETS

(71) Applicant: CORNING INCORPORATED, Corning, NY (US)

(72) Inventors: John Christopher Thomas, Elmira, NY (US); Larry Gene Smith, Tulsa, OK (US); Michael Timothy Brennan, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 99 days.

(21) Appl. No.: 15/521,474

(22) PCT Filed: Oct. 29, 2015

(86) PCT No.: PCT/US2015/057946
§ 371 (c)(1),
(2) Date: Apr. 24, 2017

(87) PCT Pub. No.: WO2016/069835
PCT Pub. Date: May 6, 2016

(65) Prior Publication Data
US 2018/0297886 A1  Oct. 18, 2018

Related U.S. Application Data

(60) Provisional application No. 62/217,298, filed on Sep. 11, 2015, provisional application No. 62/140,033, (Continued)

(51) Int. Cl.
*C03B 23/03* (2006.01)
*C03B 23/023* (2006.01)
(Continued)

(52) U.S. Cl.
CPC ...... *C03B 23/0235* (2013.01); *C03B 23/0254* (2013.01); *C03B 23/0258* (2013.01);
(Continued)

(58) Field of Classification Search
CPC .................................................... C03B 23/03
See application file for complete search history.

(56) References Cited

U.S. PATENT DOCUMENTS 2,971,294 A  8/1951  Hohmann et al.
3,960,535 A  6/1976  Hamilton et al.
(Continued)

FOREIGN PATENT DOCUMENTS

CH  276084  6/1951
EP  0429347  5/1991
(Continued)

OTHER PUBLICATIONS

Patent Cooperation Treaty International Notification of Transmittal of the International Search Report and The Written Opinion of the International Searching Authority, international application No. PCT/US2015/059367: dated Feb. 5, 2016, 14 pages.
(Continued)

*Primary Examiner* — Cynthia Szewczyk
(74) *Attorney, Agent, or Firm* — John P. Ciccarelli

(57) ABSTRACT

Apparatus and methods for bending thin glass sheets are described. The methods and apparatus described include positioning an auxiliary heater between a furnace and an entrance to glass bending station and/or positioning a downstream auxiliary heater between a glass bending station and a quench station. Also described are apparatus and methods for bending thin glass sheets by compensating for heat loss and maintaining the glass viscosity within a workable range for the bending or forming operation. Auxiliary heating
(Continued)

elements can be placed in locations that would otherwise provide for excessive heat loss.

13 Claims, 15 Drawing Sheets

Related U.S. Application Data filed on Mar. 30, 2015, provisional application No. 62/072,146, filed on Oct. 29, 2014.

(51) Int. Cl.
*C03B 23/025* (2006.01)
*C03B 29/08* (2006.01)
*C03B 23/033* (2006.01)

(52) U.S. Cl.
CPC ........ *C03B 23/033* (2013.01); *C03B 23/0307* (2013.01); *C03B 29/08* (2013.01)

(56) References Cited

U.S. PATENT DOCUMENTS

| | | | |
|---|---|---|---|
| 4,061,451 A | 12/1977 | Bardet | |
| 4,071,344 A | 1/1978 | Blausey, Jr. | |
| 4,891,055 A | 1/1990 | Shibaoka et al. | |
| 5,045,103 A | 9/1991 | McMaster et al. | |
| 5,074,900 A * | 12/1991 | Yoshizawa | C03B 23/0235 65/106 |
| 5,149,352 A * | 9/1992 | Yoshizawa | C03B 23/0302 65/106 |
| 5,346,526 A | 9/1994 | Flaugher et al. | |
| 5,735,922 A | 4/1998 | Woodard et al. | |
| 6,279,346 B1 | 8/2001 | Ribes et al. | |
| 6,363,753 B1 * | 4/2002 | Yoshizawa | C03B 23/033 193/35 F |
| 8,673,207 B1 | 3/2014 | Boger et al. | |
| 8,986,072 B2 | 3/2015 | Darcangelo et al. | |
| 2002/0116950 A1 | 8/2002 | Dunifon et al. | |
| 2004/0107729 A1 | 6/2004 | Fukami et al. | |
| 2005/0138967 A1 | 6/2005 | Hori et al. | |
| 2008/0134723 A1 | 6/2008 | Maeda | |
| 2010/0129602 A1 | 5/2010 | Dejneka | |
| 2010/0300152 A1 | 12/2010 | Dannoux | |
| 2011/0277506 A1 * | 11/2011 | Lewandowski | C03B 23/0302 65/90 |
| 2012/0094084 A1 | 4/2012 | Fisher et al. | |
| 2012/0297828 A1 | 11/2012 | Bailey et al. | |
| 2012/0328843 A1 | 12/2012 | Cleary et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson | |
| 2013/0127202 A1 | 5/2013 | Hart | |
| 2013/0295357 A1 | 11/2013 | Cleary et al. | |
| 2013/0319046 A1 | 12/2013 | Cleary et al. | |
| 2013/0323415 A1 | 12/2013 | Brackley et al. | |
| 2013/0329346 A1 | 12/2013 | Dannoux et al. | |
| 2014/0087159 A1 | 3/2014 | Cleary et al. | |
| 2014/0087193 A1 | 3/2014 | Cites et al. | |
| 2014/0141217 A1 | 5/2014 | Gulati et al. | |
| 2014/0157828 A1 | 6/2014 | Dannoux et al. | |
| 2014/0239034 A1 | 8/2014 | Cleary et al. | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0122406 A1 | 5/2015 | Fisher et al. | |
| 2015/0132538 A1 | 5/2015 | Cleary et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |
| 2016/0082705 A1 | 3/2016 | Fisher et al. | |
| 2016/0145139 A1 | 5/2016 | Fredholm et al. | |
| 2016/0207819 A1 | 7/2016 | Cleary et al. | |
| 2016/0207820 A1 | 7/2016 | Cleary et al. | |
| 2016/0250825 A1 | 9/2016 | Cleary et al. | |

FOREIGN PATENT DOCUMENTS

| | | |
|---|---|---|
| EP | 0448959 A1 | 10/1991 |
| JP | 20051919 | 1/2005 |
| WO | 2012162223 A1 | 11/2012 |
| WO | 2013055589 | 4/2013 |
| WO | 2014004085 | 1/2014 |
| WO | 2014099560 | 6/2014 |

OTHER PUBLICATIONS

International Search Report and Written Opinion of the International Searching Authority: PCT/US2015/057946; dated May 4, 2016.

* cited by examiner

APPARATUS AND METHOD FOR SHAPING OR FORMING HEATED GLASS SHEETS

CROSS-REFERENCE TO RELATED APPLICATIONS

This application is a national stage entry of International Patent Application Ser. No. PCT/US15/57946 filed on Oct. 29, 2015, which claims the benefit of priority under 35 U.S.C. § 119 of U.S. Provisional Application Ser. No. 62/217,298 filed on Sep. 11, 2015, U.S. Provisional Application Ser. No. 62/140,033 filed on Mar. 30, 2015, and U.S. Provisional Application Ser. No. 62/072,146 filed on Oct. 29, 2014, the content of which is relied upon and incorporated herein by reference in its entirety.

BACKGROUND

Principles and embodiments of the present disclosure relate generally to curved glass production systems and methods.

Curved glass sheets are used in a variety of applications including automotive and architectural glass. For such applications, sheets of glass are precisely bent to defined shapes and/or curvatures determined by the configurations and sizes of the openings, as well as the vehicle style or architectural aesthetics. Such curved glass articles may be made by heating a flat glass sheet to a suitable temperature for forming, and applying forces to the sheet to change the shape.

Some glass bending methods involve heating the glass sheet in a lehr or furnace and forming the sheet while it is still in a high temperature state within the lehr or furnace. Glass sheets may also be bent by initially heating the glass sheet in a lehr or furnace to a suitable temperature, then transferring the glass sheet to a glass bending apparatus outside the lehr or furnace.

Glass sheets that undergo such bending operations have typically been 2.5 mm, 3 mm, or greater in thickness. Glass sheets with such thicknesses can have sufficient thermal mass that they do not cool down below suitable working temperatures, while being transferred from the furnace to the bending apparatus or during a bending operation.

Glass sheets with a thickness below about 2 mm, and in particular below about 1.6 mm typically do not have enough thermal mass to remain at a suitable working temperature, and become more challenging to bend because they tend to cool too quickly to bend in an acceptable manner.

The exit of a furnace is typically an opening in a furnace wall made of a refractory material such as firebrick or ceramic, which may or may not be covered by a moving door or restriction. Such constructions can introduce an unheated length into the glass sheet travel distance. In addition, there may be an unheated gap or transfer zone between the furnace exit and the entrance to a bending apparatus. These unheated regions provide a space where the glass sheet can lose heat and cool down.

In some instances, a glass sheet may be heated to a temperature higher than necessary for forming to offset such cooling effects. Heating the glass sheet to higher temperatures prior to bending, however, must be balanced between the benefit of having the part hot enough to bend, and the detriment of the higher temperature making the glass more susceptible to distortion and marking. Glass that is not at an appropriate temperature during a bending operation may exhibit optical distortions, such as roller waves (optical roll distortion) and/or discrete marking(s) and/or defect(s) that may make the bent sheet unsuitable for its intended purpose.

FIG. 1 illustrates a typical apparatus and process for bending glass sheets. Glass sheet 12 exits furnace 10, which includes a heat source comprised of a plurality of heating sections 14, only one of which is shown at the exit end of the furnace 10. The glass sheet is conveyed along a conveyor 16, which is shown as a plurality of rollers 18 supporting the glass sheet as is moves in the direction of arrow to a bender 22. Such a conveyor 16 including rollers is known as a roll conveyor. The bender 22 can be any suitable bending apparatus for producing bends in thin glass sheets to precisely form curved glass sheets. As shown in FIG. 1, there is a gap or space 30 between exit end 24 of the furnace and entrance end 26 of the bender 22. The exit end 24 of the furnace 10 is defined by an insulated wall, which is typically a refractory ceramic material.

An example of a commercial method of producing such curved glass sheets generally includes heating pre-trimmed, flat sheets of glass to the softening temperature in a furnace or lehr, press bending the heated sheets to a desired curvature between male and female mold members having complementary shaping surfaces, and cooling the curved sheets in a controlled manner. Such a bending technique is referred to as "press bending" and may suitably be carried out with the glass sheets oriented vertically, horizontally or obliquely. The glass sheets are typically conveyed to the press bender on a conveyor using a belt or rolls.

Another example of a commercial method of producing curved glass sheets in a roll bending station. For example, such a process would include heating pre-trimmed, flat sheets of glass to the softening temperature in a furnace or lehr, roll bending the heated sheets in a roll bender to a desired curvature, and cooling the curved sheets in a controlled manner. The glass sheets are typically conveyed from the furnace or lehr to the roll bender having horizontal rolls and laterally spaced sets of inclined rolls downstream from the furnace. The laterally spaced inclined rolls are typically provided in sets having progressively increasing inclination along the direction of conveyance to form each heated glass sheet during conveyance over or between sets of inclined rolls.

Generally, there has been a desire to produce thinner glass sheets for automotive glazing closures to provide closures that are lighter in weight and have lower production costs. Existing bending processes described above are capable of processing glass sheets thicker than 1.5 mm, they may not be suitable in the processing of glass sheets thinner than 1.6 mm, for example, thinner than 1 mm, or thinner than 0.8 mm. Furthermore, there is a challenge in providing quenching process that can quench glass sheets thinner than 2.6 mm. Accordingly, it would be desirable to provide apparatus and processes that a capable of quenching glass sheets thinner than 2.6 mm and/or producing curved glass sheets thinner than 1.6 mm in bending operations.

SUMMARY

A first embodiment pertains to an apparatus for bending heated glass sheets. In one embodiment, the apparatus comprises a glass sheet bending station including a glass sheet receiving end, such that when the glass sheet bending station is located adjacent to an upstream furnace, the glass sheet bending station receives glass sheets conveyed from the upstream furnace, the glass sheet bending station further including a glass sheet exit end, and a bending member positioned such that when the glass sheet is conveyed into the glass sheet bending station, the glass sheet is bent, the glass sheet bending station further including an optional internal heater to impart heat to the bending station between the receiving end and the exit end. The apparatus further comprises an auxiliary heater positioned adjacent the receiving end of the glass sheet bending station, the auxiliary heater positioned to direct heat toward the glass sheet when the glass sheet exits the furnace and is conveyed into the receiving end of the glass sheet bending station.

Another aspect of the disclosure pertains to a method of processing glass sheets. In one embodiment, the method comprises conveying a glass sheet through a furnace positioned adjacent a glass sheet bending station, the furnace including an interior between a furnace entrance end wall and a furnace exit end wall and an internal heater to heat the interior and the glass sheet as it is conveyed through the furnace. The method further comprises conveying the glass sheet to a glass sheet bending station that imparts a bending force to the glass sheet between a pair of bending members. The method further comprises applying auxiliary heat to the glass sheet after the glass sheet exits the furnace interior and prior to entering the glass sheet bending station.

Another aspect pertains to an apparatus for bending heated glass sheets comprising: a glass sheet bending station including a glass sheet receiving end, such that when the glass sheet bending station is located adjacent to an upstream furnace, the glass sheet bending station receives glass sheets conveyed from the upstream furnace, the glass sheet bending station further including a glass sheet exit end, and a bending member positioned such that when the glass sheet is conveyed into the glass sheet bending station, the glass sheet is bent; a quench station positioned downstream from the bending station; and at least one auxiliary heater positioned in location selected from one or both (1) adjacent the receiving end of the glass sheet bending station, the auxiliary heater positioned to direct heat toward the glass sheet when the glass sheet exits the furnace and is conveyed into the receiving end of the glass sheet bending station and (2) downstream from the bending station and upstream from the quench station. In one or more embodiments, the apparatus includes a downstream auxiliary heater downstream from the bending station and upstream from the quench station, and there is no auxiliary heater adjacent the receiving end of the glass sheet bending station.

BRIEF DESCRIPTION OF THE DRAWINGS

The accompanying figures, which are incorporated in and constitute a part of this specification, illustrate several aspects described below.

DETAILED DESCRIPTION

Figure 1:
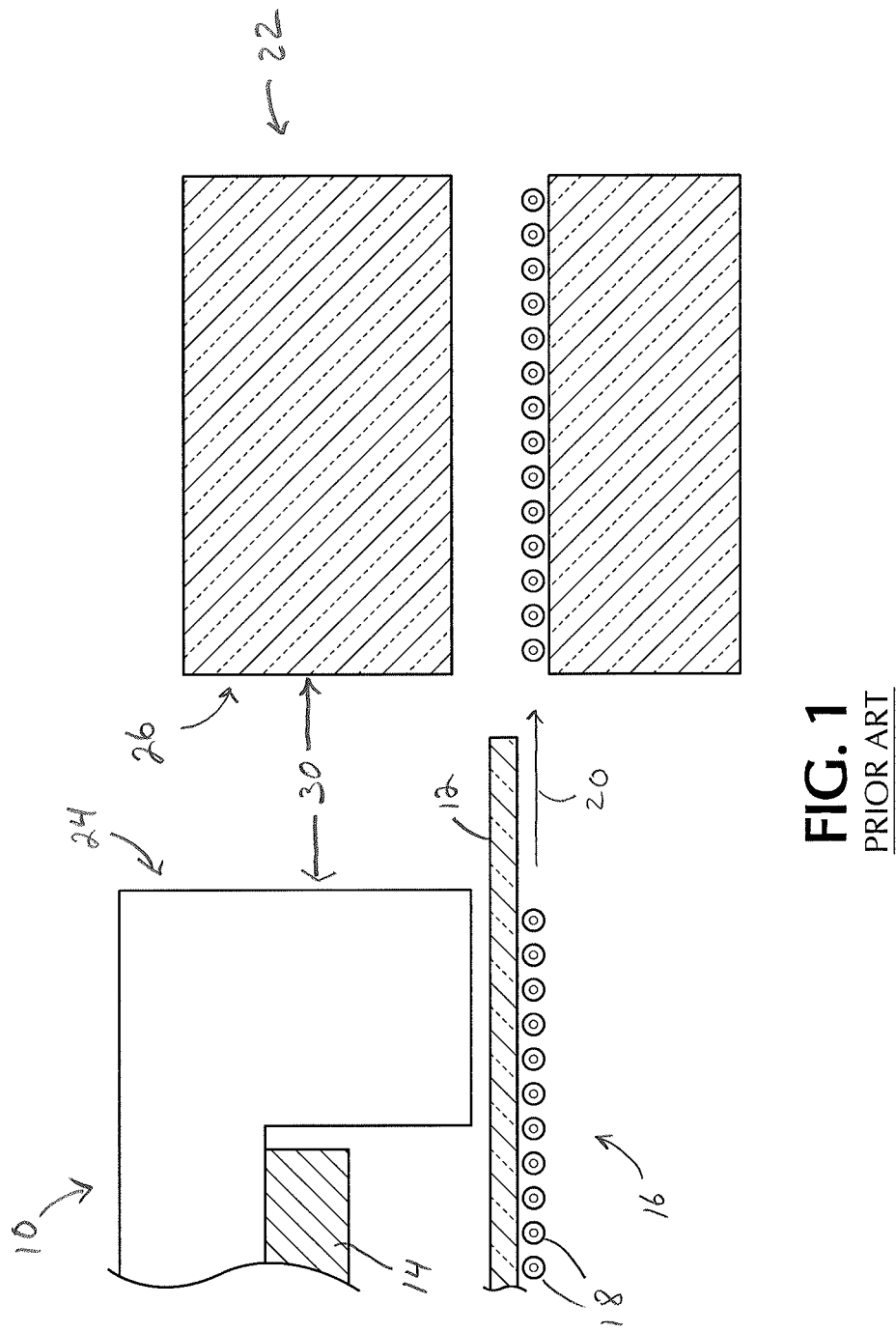
FIG. 1 is a side elevational view of a prior art apparatus for manufacturing curved glass sheets.

Before describing several exemplary embodiments of the disclosure, it is to be understood that the disclosure is not limited to the details of construction or process steps set forth in the following description. The disclosure is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Described herein are apparatus and methods for forming curved glass sheets. Most automotive glass bending apparatus are in two general categories: those that bend the glass "inside the heat" and those that bend the glass "outside the heat." For the category that bends glass outside the heat, it is particularly challenging to bend thinner glass as the glass loses heat very quickly once the glass moves beyond the furnace and toward the bending apparatus. These glass bending processes typically use soda lime glass having a thickness between 1.5 mm and 6 mm. The flat glass sheet is heated to a desired temperature for bending to form a curved glass sheet as the flat glass sheet travels through a furnace on a conveyor such as a roller conveyor. The flat glass sheet exits the furnace and then continues at a constant or accelerated speed or indexes out of the furnace into a bending apparatus or process that shapes the part and then subsequently into a cooling station (e.g., quench) that thermally tempers or heat strengthens the glass part. This bending process outside the heat varies with different equipment manufacturers, but all are challenged to bend the glass and to quench the glass before it loses too much heat. On conventional thickness glass sheets, often the part is heated to a higher temperature before exiting the furnace. However, heating the glass sheet to higher temperatures prior to bending must be balanced with benefit of having the part hot enough to bend and the detriment of the higher temperature making the glass more susceptible to distortion and marking. Methods that bend glass inside the heat include heating the bending tool or mold that is used to mitigate the heat loss while forming the part.

According to one or more embodiments of the disclosure, one or more auxiliary heaters or auxiliary heating elements are utilized to mitigate heat losses of the thin glass sheet as it exits the furnace and enters a bending apparatus. It will be appreciated that an auxiliary heater or heating element can be used to continue or extend the heat provided by the furnace heater. In addition, according to embodiments of the disclosure, an auxiliary heater or auxiliary heating element can be used in addition to the furnace and/or a heating unit provided in the bending station or bender. In an embodiment, the auxiliary heating elements are located at one or both of the furnace exit where the end wall is typically an insulated section encased in a metal enclosure and at the lead end of the bending apparatus adjacent the furnace exit that is typically open. According to embodiments of the disclosure, auxiliary heating elements are used to maintain the glass temperature as it exits the furnace and enters the bending section. According to one or more embodiments, thin glass bending is achieved by keeping the thin glass sheet at a temperature sufficient for bending while not overheating the glass sheet by maintaining the glass temperature from the furnace to the point where the glass bending starts. According to one or more embodiments, the one or more auxiliary heaters maintain the glass sheet at the glass processing temperature obtained in the heating furnace.

According to embodiments of the disclosure, "maintain," refers to the glass sheet temperature being kept at approximately the same temperature when the glass sheet was in the furnace, and reheating is not required. According to embodiments of the disclosure, "auxiliary heater" refers to a heater that is in addition to a heater that heats the interior of the furnace and a heater that heats the glass sheet while the glass sheet is being subjected to a bending process in a bending apparatus or bending station.

One or more embodiments pertains to a method of maintaining the temperature level in a thin glass sheet after it exits the furnace or lehr heating zones before and during the bending process. Thin glass sheets lose heat very quickly once they exit the heating section of the furnace or lehr and bending outside the heating zones has not been successful with thin glass sheets using existing commercial technology, especially thin plates of thickness greater than 0.1 mm and less than 1.6 mm, specifically less than 1.5 mm, or less than 1.4 mm, or less than 1.3 mm, or less than 1.2, mm, or less than 1.0 mm, or less than 0.9 mm, or less than 0.8 mm, or less than 0.7 mm, or less than 0.6 mm, or less than 0.5 mm and more specifically less than 0.4 mm.

Embodiments of the disclosure provide an auxiliary external heater positioned between the furnace interior and the bending station entrance to maintain the temperature of the glass sheet when it was in the furnace and to allow successful glass sheet bending or forming downstream from the furnace. The auxiliary heater can be located immediately before the furnace exit, above the furnace or lehr conveyor and/or immediately before the entrance of the glass into the bending or forming section, above and below the conveyor. In one or more embodiments, downstream auxiliary heating elements can also be located between the bending or forming section and a quench section in systems and processes where the bending or forming and quench sections are separate stations. Thus, in some embodiments, auxiliary heating elements are provided to maintain the glass temperature from when it exits the furnace and is transported into the forming or bending section and also when the glass moves from the forming or bending section to enter the quench section. In some embodiments, a downstream auxiliary heating element is provided between the forming or bending section and the quench section, and there is no auxiliary heating element between the furnace and the bending or forming section. According to one or more embodiments, a feedback control system is used to accurately control the auxiliary heaters to maintain the desired glass temperature to facilitate bending but avoid optical distortions caused by glass sheet overheating. In one or more embodiments, a plurality of thermocouples is used to monitor and maintain the temperature of the glass. A feedback control loop can be used together with the thermocouples to monitor the temperature and send signals to the auxiliary heaters to increase or decrease the amount of heat provided by the auxiliary heaters to maintain the desired temperature of the glass sheets as the exit the furnace and enter the bending station and/or as the glass exits the forming or bending station and enters the quench section. As used herein, "quench,", "quench station," "quench station" and similar phrases refer to extracting heat at a rapid rate from a glass sheet to freeze the outer surface of the glass while the inner portion is still soft. A quench station or quench section or quenching process is typically conducted with forced air on the glass surface. As the cooling continues, the thermal contraction of the inner portion creates a strong compressive stress on the frozen outer surface, while a tensile stress is induced on the inner portion. This is only one example of a quenching operation, and other known quenching techniques can be used in accordance with one or more embodiments to provide quench section or quench station.

According to one or more embodiments, compared with heating systems that perform bending in the furnace, apparatus and methods are provided that enable bending of thin glass sheets using commercially available glass forming systems designed to bend thicker glass sheets outside the furnace heating sections. Embodiments of the present disclosure allow for faster change-over by using tooling beyond the furnace heating sections than when using bending tooling located inside the furnace heating sections. Embodiments of the disclosure enable the use of lower tooling costs and less downtime while enabling the ability to bend thin glass sheets outside the furnace heating sections. According to one or more embodiments, glass optical improvements are also achieved compared to existing systems, which tend to maintain the required glass temperature levels for bending by overheating the glass sheets. This overheating process can contribute to unacceptable levels of optical distortion. Embodiments of the disclosure allow thin glass sheets to be heated and maintained in a desired temperature range to avoid overheating distortions.

Figure 2:
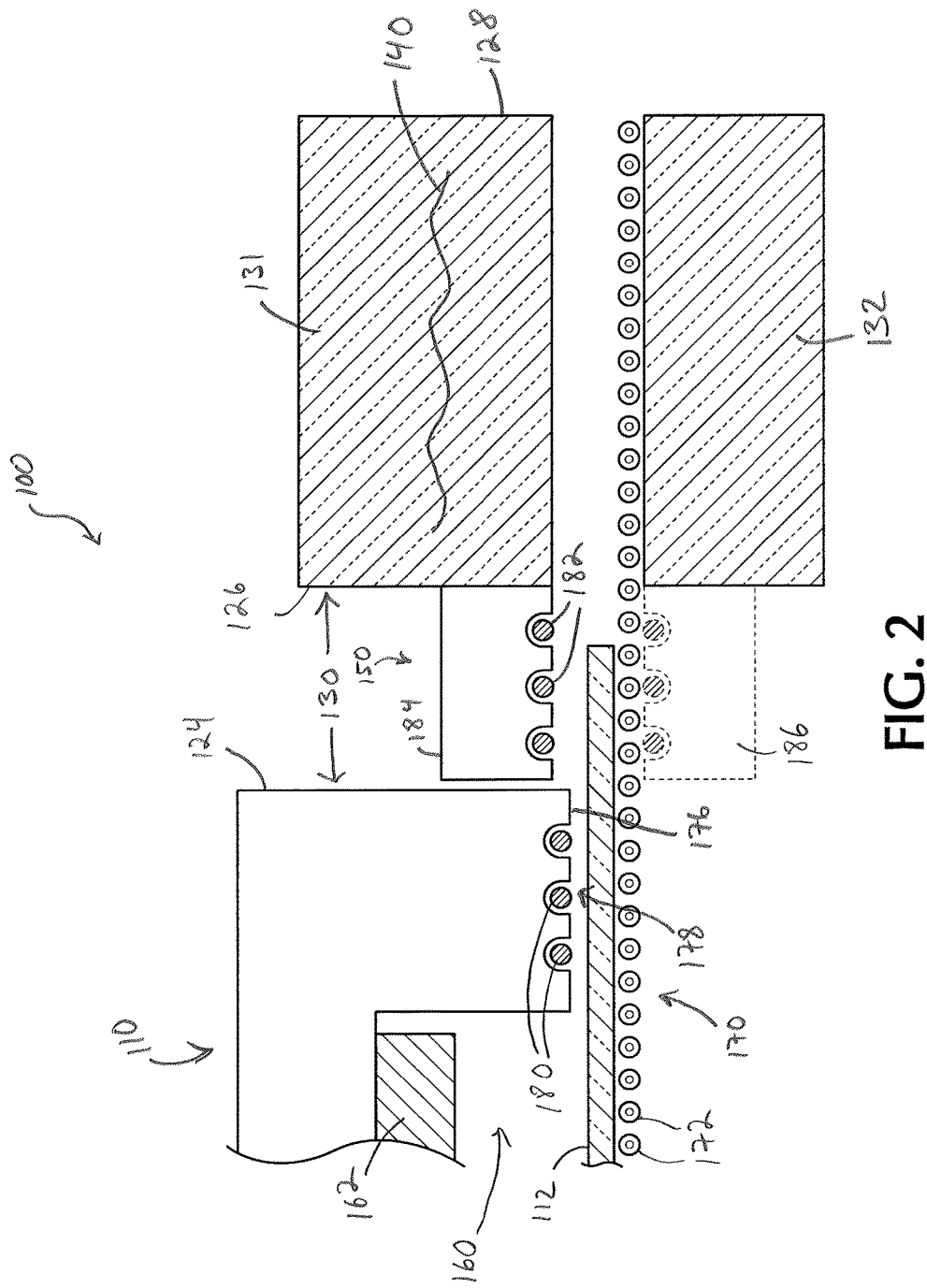
FIG. 2 is a side elevational view of an apparatus for manufacturing curved glass sheets according to one or more embodiments of the disclosure.

Referring now to FIG. 2, an exemplary embodiment of an apparatus 100 for bending heated glass sheets is shown. The apparatus includes a glass sheet bending station 122, including a receiving end 126, such that when positioned adjacent to a furnace 110, the bending station 122 receives a glass sheet 112 conveyed from the furnace 110. The glass sheet bending station 122 further including a glass sheet exit end 128, an upper bending member 131 and a lower bending member 132. The upper bending member 131 and the lower bending member 132 are positioned such that when the glass sheet 112 is conveyed into the glass sheet bending station 122, the glass sheet 112 is bent between the upper bending member 131 and lower bending member 132. The glass sheet bending station 122 can further includes an optional internal heater 140 to impart heat to the bending station between the receiving end and the exit end. The internal heater 140 can be a resistance heater or any other suitable type of heater.

The apparatus 100 further includes an auxiliary heater 150 positioned adjacent the receiving end 126 of the glass sheet bending station 122. The auxiliary heater 150 is positioned to direct heat toward the glass sheet 112 when the glass sheet 112 exits the furnace and is conveyed into the receiving end 126 of the glass sheet bending station 122.

It will be understood that the apparatus shown in FIG. 2 can include only the auxiliary heater 150 for maintaining the temperature of the glass sheet 112 as it exits the furnace 110 and enters the glass sheet bending station 122. However, as noted above, the bending station may include an internal heater 140 as well to heat glass sheet 112 while it is in the bending station 122. However, it will be understood that the auxiliary heater 150 provides auxiliary or supplemental heat in addition to the heat supplied by the furnace 110 and the option internal heater 140, which is internal to the bending station 122. In other words, the auxiliary heater directs heat and maintains the temperature of the glass sheet 112 after it exits the furnace 110 and prior to entering the glass sheet bending station 122. It has been determined that with thinner glass sheets, for examples, glass sheets having a thickness greater than 0.1 mm and less than 1.5 mm, specifically less than 1 mm, and more specifically less than 0.8 mm, the heat loss from the glass sheet is excessive. This excessive loss can result in a process that cannot produce consistent and quality bending to provide glass sheets that meet customer requirements. An auxiliary heater positioned between the exit of the furnace and the entrance to the bending station allows for consistent and quality bending.

Still referring to FIG. 2, the furnace 110 includes an end wall 124 and an entrance wall (not shown), which define an interior space 160 in the furnace 110. Heating is achieved in the interior space 160 by a plurality of heating sections 162, only one of which is shown. It will be appreciated that the furnace 110, which may also be referred to as a lehr, is an elongate furnace including a conveyor 170, which may include any conventional conveyor mechanism such as a belt, an air float conveyor, or rollers 172 shown in FIG. 2. The glass sheet 112 is conveyed toward the end wall 124 of the furnace on the conveyor rollers, exits the furnace and is conveyed toward the bending station 122.

Referring back to FIG. 1, it will be appreciated that there is a distance between the last heating section 14 and entrance end 26 of the glass sheet bending station, where there is no heat directed towards the glass sheet, and the glass sheet will cool prior to bending. When the glass sheet is thinner than 1.5 mm, 1 mm, or even 0.8 mm, the heat loss from the glass sheet as it moves toward the bender 22 or bending station will be significant. Referring to FIG. 2, according to one or more embodiments, the end wall 124 includes an underside surface 176 that faces the glass sheet 112 when the glass sheet 12 exits the furnace 110. In the embodiment shown in FIG. 2, the end wall 124 includes an end wall heater 178 on the end wall 124 to direct heat toward the glass sheet 112 when it exits the furnace. In the embodiment shown, the end wall heater 178 comprises a plurality of elongate, heating elements 180, which can be of the resistive type, embedded in the underside surface 176 of the end wall 124.

Still referring to FIG. 2, the auxiliary heater 150 similarly can comprise a plurality of heating elements 182 mounted to the receiving end 126 of the glass sheet bending station. In the embodiment shown, the heating elements 182 are elongate resistive heating elements. It will be understood that the disclosure is not limited to a particular type of heating element. For example, suitable heating elements can include radiant heating elements such heating lamps, a laser, a burner, etc. may be utilized. FIG. 2 shows an embodiment in which the auxiliary heater comprises a single heating unit 184, positioned above the glass sheet, and an optional second heating unit 186 positioned below the glass sheet 112, as the glass sheet passes through the receiving end 126 of the glass sheet bending station 122. Thus, the heating unit 184 may be referred to an upper heating unit comprised of the plurality of heating elements 182, more specifically elongate resistive heating elements, and the heating unit 186, may similarly be comprised of heating elements 182, in particular a plurality of elongate resistive heating elements as shown.

Figure 3:
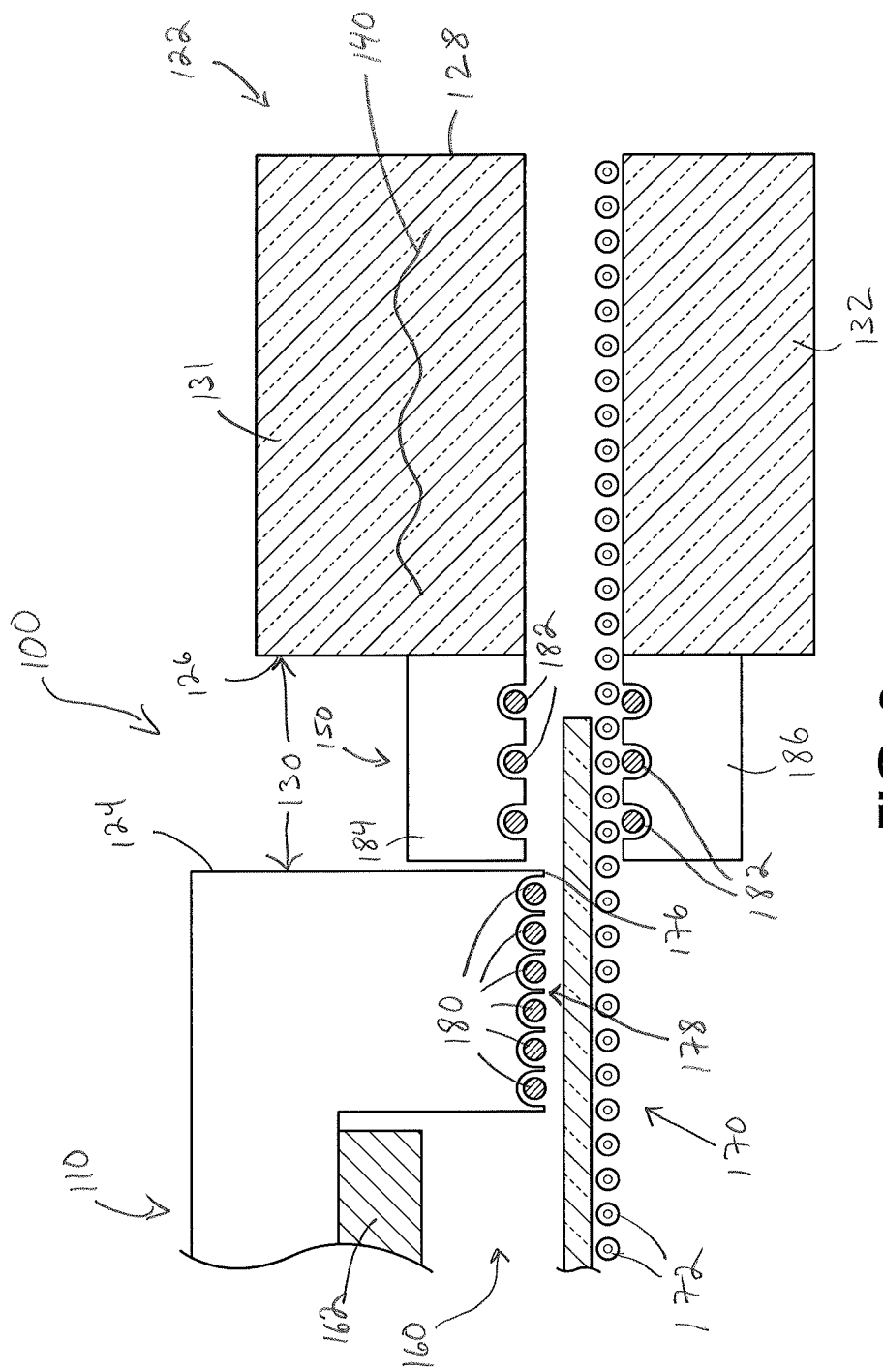
FIG. 3 is a side elevational view of an apparatus for manufacturing curved glass sheets according to one or more embodiments of the disclosure.

FIG. 3 shows a configuration similar to FIG. 2, except that the auxiliary heater 150 includes the pair of heating units 184 and 186 with both units including a plurality of heating elements 182. It will he appreciated from FIGS. 2 and 3 that with the inclusion of one or both of the end wall heater 178 and the auxiliary heater 150, which may include a single heating unit 184 or a pair of heating units 184, 186, the gap 130 and the area under the furnace end wall is now heated and glass sheet 112 is maintained at a constant temperature as it exits the furnace interior and prior to entering the glass sheet bending station 122.

The heating elements 180 embedded in the end wall 124 can be any suitable heating elements, including but not limited to radiant heating elements, laser heating elements, flame heating elements, etc. However, as shown in FIGS. 2 and 3, elongate resistance heating elements can be utilized and achieve suitable results. In FIG. 3, six elongate resistive heating elements at 9.5 kW each are shown as embedded in the end wall 124. In addition, heating elements 182, in particular three elongate resistive heating elements, are shown in each of the heating units 184 and 186, and each of these heating elements can also be operated at a suitable power to maintain the glass at the desired temperature. It will be understood that the disclosure is not limited to the configuration shown and other heating elements and power values can be used. The auxiliary end wall heating elements and the heating elements that make up the auxiliary heater should provide sufficient heat to maintain the glass temperature as it enters the bending station 122. In addition the heating elements should be appropriately sized and/or spaced to heat the entire width of the glass sheet being conveyed through the apparatus.

The bending station can comprise any suitable station to impart a bend or curve to the glass sheet. For example, a gravity sag bending unit can be used in which glass is bent or curved while held by a peripheral ring and gravity is used to bend or curve the glass while supported by the ring. Other bending apparatus will be described below and include roll benders or press benders.

Figure 4:
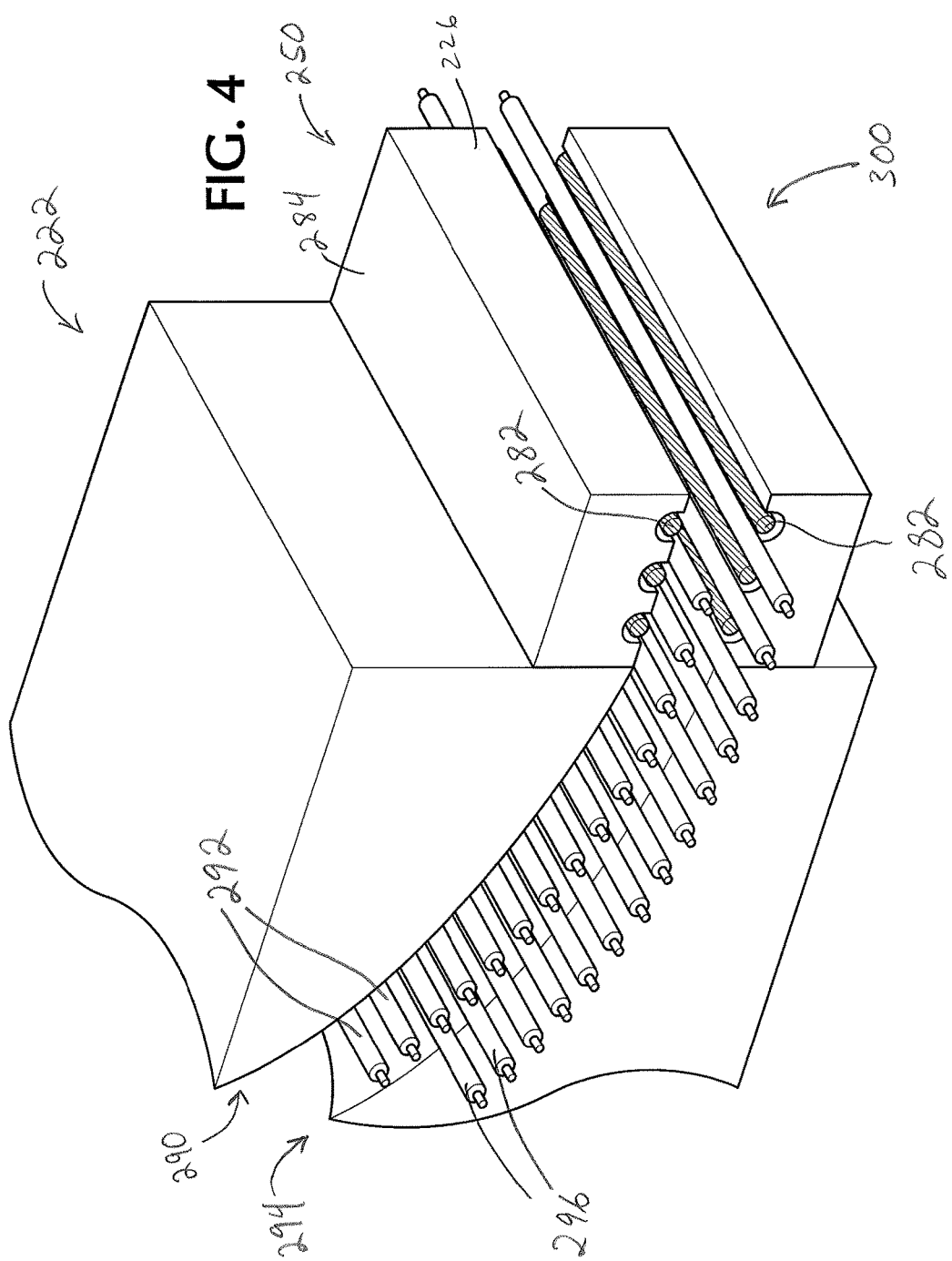
FIG. 4 is a perspective view of an apparatus for manufacturing curved glass sheets according to one or more embodiments of the disclosure.

Referring now to FIG. 4, a specific embodiment of a bending station is shown. In specific embodiments, the bending station shown in FIGS. 2 and 3 is a roll bender 222. As is understood in the art, a roll bender 222 can includes an upper member 290 comprising a first set of laterally spaced inclined rolls 292. A lower member 294 is comprised of a second set of a plurality of laterally spaced inclined rolls 296. As is understood in the art, a glass sheet is fed by a conveyor from a furnace as shown in FIGS. 2 and 3. Thus, when the bending station in FIGS. 2 and 3 is the roll bender 222 shown in FIG. 4, the glass sheet is fed into a receiving end 226 of the roll bender 222 in the direction of arrow 300. Auxiliary heater 250 including heating elements 282 on the receiving end of the roll bender 222 provides heat to maintain the glass temperature as it enters the roll bender 222 between the upper member 290 and lower member 294, which subject the glass to bending force as the glass moves between the inclined rolls 292, 296. It will be understood that the roll bender 222 shown in FIG. 4 is an exemplary embodiment of a roll bender, and many modifications can be used. As used herein "roll bender" refers to an apparatus for bending glass sheets using rolls.

Figure 5:
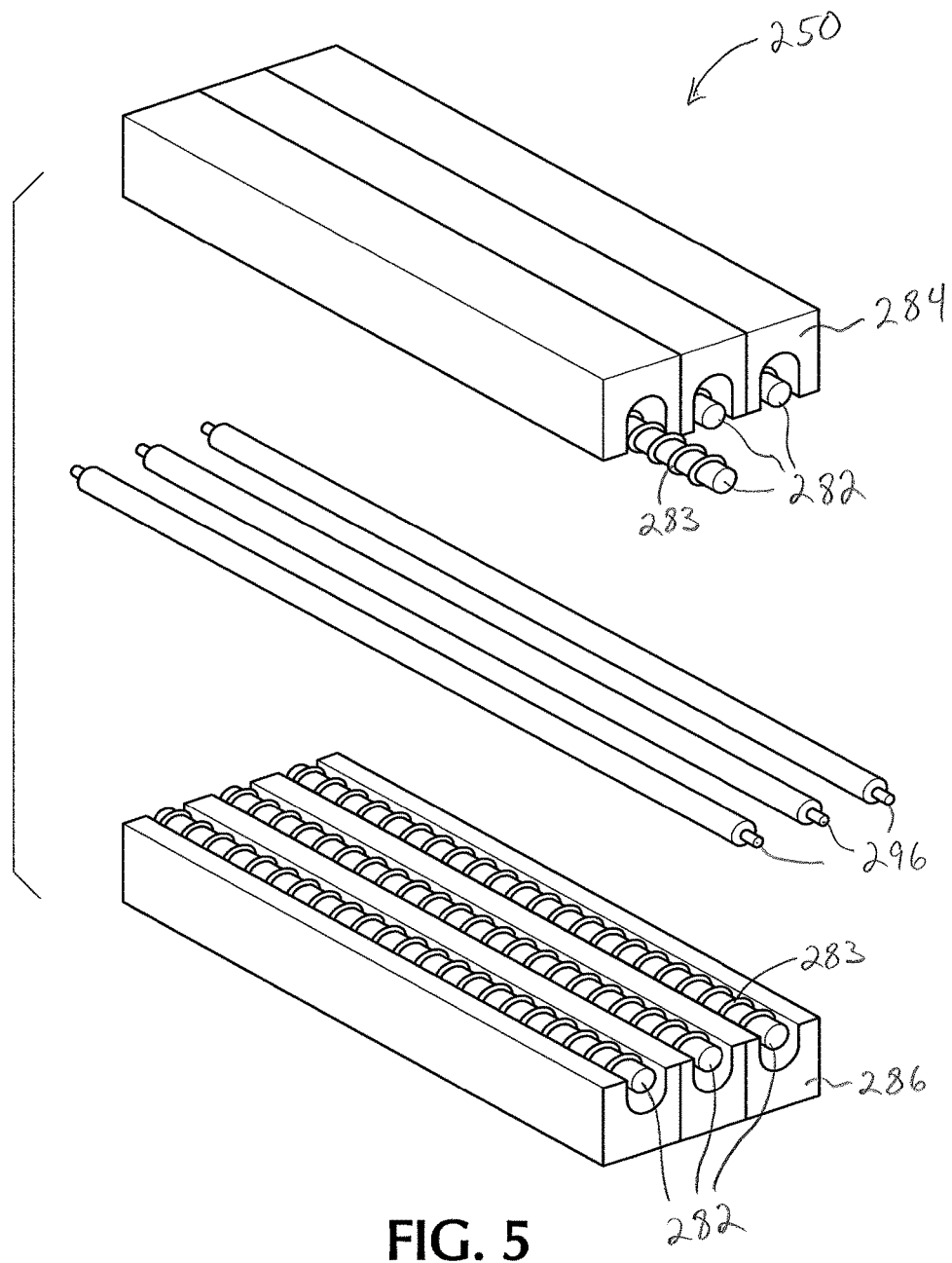
FIG. 5 is an exploded perspective view of a portion of an apparatus for manufacturing curved glass sheets according to one or more embodiments of the disclosure.

FIG. 5 shows an exploded perspective view of the auxiliary heater 250 including an upper heating unit 284 and a lower heating unit 286, each including a plurality of heating elements 282, in particular, elongate resistive heating elements, and including heating coils 283.

Figure 6:
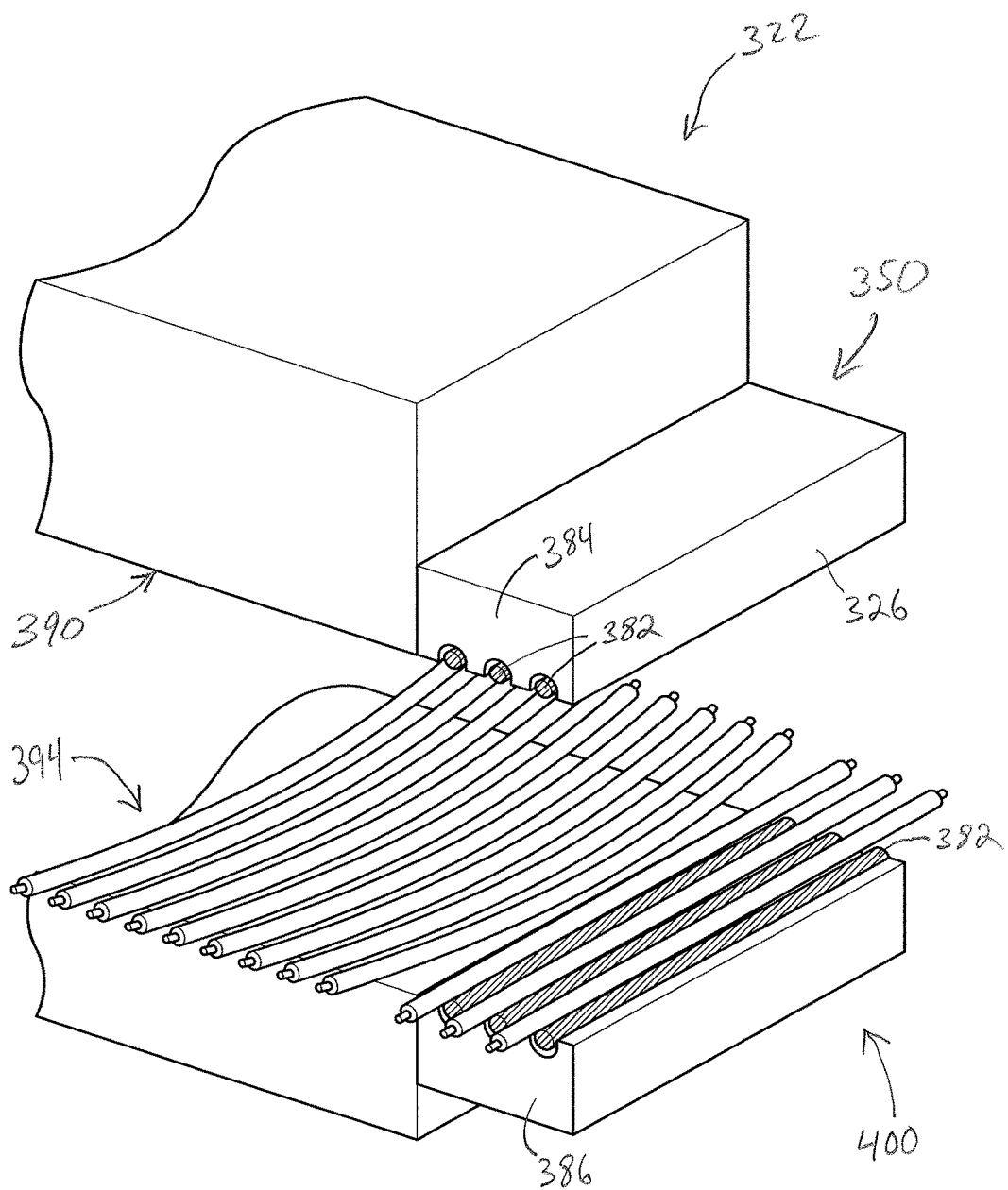
FIG. 6 is a partial perspective view of an apparatus for manufacturing curved glass sheets according to one or more embodiments of the disclosure.

FIG. 6 shows an exemplary, embodiment in which the sheet bending station comprises a press bender 322 with a receiving end 326 to receive a glass sheet in the direction of arrow 400 from a furnace. The press bender comprises an upper member which is a male mold 390 and a lower member which is a female mold 394. It will be understood that this configuration can be reversed, that is, the male mold can be the lower mold and the female mold can be the upper mold. An auxiliary heater 350 comprises a pair of heating units, including an upper heating unit 384 and a lower heating unit 386, each including a plurality of elongate, resistive heating elements 382. The auxiliary heater 350 maintains the temperature of the glass sheet as it exits the furnace and enters the press bender 322, which is subjected to a bending force by the complementary shaping surfaces of the upper member and lower member. It will be understood that the press bender 322 shown in FIG. 6 is an exemplary embodiment of a press bender, and many modifications can be used. As used herein "press bender" refers to an apparatus for bending glass sheets between complementary molds.

It will be understood that the roll bender shown in FIG. 4 and the press bender shown in FIG. 6 can be used with the apparatus shown in FIGS. 2 and 3. The elongate resistive heating elements have a length that is equal to or greater than the width of the glass sheet being conveyed by the conveyor 170 comprised of rollers 172. Other conveyor types such as belt conveyor or air float or suspension conveyor can be utilized.

Another aspect of the disclosure pertains to a method of bending a glass sheet, which includes conveying a glass sheet through the apparatus shown in any of FIGS. 2, 3, 4 and 6 to produce a glass sheet with a bend or a curved surface. The glass can have a thickness greater than 0.1 mm, and less than 1.5 mm, or less than 1.4 mm, or less than 1.3 mm, or less than 1.2 mm, or less than 1.1. mm, or less than 1.0 mm, or less than 0.9 mm, or less than 0.8 mm, or less than 0.7 mm, or less than 0.6 mm, or less than 0.5 mm or less than 0.4 mm. In specific embodiments, a method of bending a glass sheet is provided which includes conveying a glass sheet through a furnace positioned adjacent a glass sheet bending station, the furnace including an interior between an entrance end wall and an exit end wall and an internal heater to heat the interior and the glass sheet as it is conveyed through the furnace. The glass sheet is then conveyed to a glass sheet bending station that imparts a bending force to the glass sheet between a pair of bending members. Auxiliary heat is applied to the glass sheet after the glass sheet exits the furnace interior and prior to entering the glass sheet bending station. Auxiliary heat can be applied at the end wall of the furnace. In one or more embodiments, auxiliary heat is provided after the glass sheet moves past the furnace end wall and before entering the glass sheet bending station. The glass sheet bending station according to the methods described above can be a press bender or a bend roller as described above.

In another embodiment not shown, an auxiliary heater can be provided in the furnace end wall as shown in FIGS. 2 and 3, and instead of having a downstream bending station as shown in FIGS. 2 and 3, bending can be conducted in the furnace interior, and the glass is then conveyed to a glass quench section for cooling. An apparatus and process of this type is useful for curved glass sheets having a thickness less than 2.8 mm. Thus, according to this embodiment, an apparatus comprises a conveyor to convey glass sheets through a furnace from an entrance end to an exit end and to a quench section; the furnace including an entrance end wall and an exit end wall defining furnace interior, the furnace including a furnace heat source in the furnace interior and the exit end wall having an underside surface that faces the glass sheet when a glass sheet exits the furnace; and an auxiliary heater on the furnace end wall to direct heat at the glass sheet as it exits the furnace to maintain the temperature of the glass sheet after the glass sheet is conveyed past the furnace interior. In one embodiment, the apparatus comprises a quench section to cool the glass after the glass sheet is conveyed past the furnace end wall. In one embodiment, the quench section has an auxiliary heater that can be similar to the auxiliary heater described with respect to FIGS. 2 and 3. In one embodiment, the apparatus comprises a bending station located in the furnace interior.

It has been found that thin glass at about 1.5 mm in thickness and less cools too quickly to form properly in a bending apparatus external to the furnace heating section, which can result in unacceptable flaws or the glass article breaking during a bending operation.

In addition, thin glass at about 1.5 mm and less in thickness can be more prone to distortion if it is heated to higher temperatures to off-set such cooling. The leading and trailing edges of each glass sheet form a cantilever when the sheet edge is unsupported by a roller. When heated above a particular temperature, a glass sheet can sag under the load of its own cantilevered weight, where such sagging can be greater for thinner sheets and sheets heated to higher temperatures. Such sagging may also occur across the unsupported sections of a sheet between support rollers. One or more of these problems may be addressed by maintaining the thin glass sheets at a viscosity which allows bending of the glass while it is being conveyed and formed without initially softening the glass to a point at which distortions can be easily introduced.

Principles and embodiments of the present disclosure relate to a curved glass production system comprising a furnace and a bending apparatus that can bend glass sheets having a thickness in the range of about 0.1 mm to about 1.5 mm.

Principles and embodiments of the present disclosure relate to a curved glass production system that can maintain a glass sheet having a thickness in the range of about 0.1 mm to about 1.5 mm, or less than 1.5 mm to 0.1 mm, at a suitable viscosity during transport and forming operations to be bent by a bending apparatus.

In one or more embodiment, a glass sheet entering a bending apparatus may have a viscosity in the range of about $1 \times 10^{9.9}$ poise to about $1 \times 10^{12.6}$ poise, or in a range of about $1 \times 10^{9.9}$ poise to about $1 \times 10^{11.5}$ poise, or in a range of about $1 \times 10^{9.9}$ poise to about $1 \times 10^{11}$ poise, or in a range of about $1 \times 10^{10}$ poise to about $1 \times 10^{11}$ poise.

In one or more embodiment, a glass sheet exiting a furnace may have a viscosity in the range of about $1 \times 10^{9.9}$ poise to about $1 \times 10^{12.6}$ poise.

In one or more embodiment, a glass sheet may be maintained at a viscosity in the range of about $1 \times 10^{9.9}$ poise to about $1 \times 10^{12.6}$ poise, while the glass sheet is being transferred across a gap from a furnace to a bending apparatus. In various embodiments, the glass sheet is maintained at a viscosity in the range of about $1 \times 10^{9.9}$ poise to about $1 \times 10^{12.6}$ poise, or in a range of about $1 \times 10^{9.9}$ poise to about $1 \times 10^{12.2}$ poise, or in a range of about $1 \times 10^{9.9}$ poise to about $1 \times 10^{11.5}$ poise, or in a range of about $1 \times 10^{9.9}$ poise to about $1 \times 10^{11}$ poise, or in a range of about $1 \times 10^{10}$ poise to about $1 \times 10^{11}$ poise, while the glass sheet is being transferred from a furnace to a bending apparatus by one or more auxiliary heating elements, where the auxiliary heating elements may be located between the furnace and the curved glass production system.

In one or more embodiments, a bending apparatus may be a roller-bending apparatus, a gravity sag bending apparatus, or a press-bending apparatus.

In one or more embodiments, a press-bending apparatus may comprise a male mold form (also referred to as a male bending form) and a female mold form (also referred to as a female bending form). In various embodiments, the female bending form may comprise a ring or frame that engages and/or supports at least a portion of the periphery of a heated glass article, which may be a flat sheet, and provides a hollow space in at least a middle portion of the ring to receive a portion of the glass sheet during a forming operation. In various embodiments, the female bending form and the male bending form are configured to engage each other to shape the glass article. In various embodiments, the heating elements, furnace exit opening, the female bending form and the male bending form may be oriented horizontally.

In various embodiments, a softened glass sheet may be placed in a female bending form of a press-bending apparatus. In various embodiments, the softened glass sheet may be allowed to sag under gravity before bending.

In one or more embodiments, one or more auxiliary heating elements may be located between the furnace exit and the entrance of the bending apparatus, wherein the one or more auxiliary heating elements may be adjacent to the furnace exit and/or the bending apparatus entrance. In various embodiments, the one or more auxiliary heating elements may be connected to and/or operatively associated with the bending apparatus, where the auxiliary heating element(s) move in synchronization with at least a portion of the bending apparatus. In one or more embodiments, downstream auxiliary heating elements can also be located between the bending apparatus and a quench section in systems and processes where the bending and quench sections are separate stations. Thus, in some embodiments, auxiliary heating elements are provided to maintain the glass temperature from when it exits the furnace and is transported into the forming section and also when the glass moves from the forming section to enter the quench section.

In one or more embodiments of the disclosure, one or more auxiliary heating element(s) are used to maintain the glass at a viscosity in the range of about $1 \times 10^{9.9}$ poise to about $1 \times 10^{12.6}$ poise, or in a range of about $1 \times 10^{9.9}$ poise to about $1 \times 10^{12.2}$ poise, or in a range of about $1 \times 10^{9.9}$ poise to about $1 \times 10^{11.5}$ poise, or in a range of about $1 \times 10^{9.9}$ poise to about $1 \times 10^{11}$ poise, or in a range of about $1 \times 10^{10}$ poise to about $1 \times 10^{11}$ poise, between when the glass exits the furnace or lehr and enters the bending apparatus. In various embodiments, thin glass bending is achieved by keeping the thin glass sheet at a viscosity sufficient for bending by imparting heat energy to the glass sheet from the heating element(s), while not making the glass sheet too soft (i.e., below about $1 \times 10^{9.9}$ poise). According to one or more embodiments, the one or more auxiliary heating elements maintain the glass sheet at about the glass processing viscosity established in the heating furnace.

Various exemplary embodiments of the disclosure are described in more detail with reference to the figures. It should be understood that these drawings only illustrate some of the embodiments, and do not represent the full scope of the present disclosure for which reference should be made to the accompanying claims. It also should be noted that the figures are not to scale and the sizes of the various illustrated components are for ease of depiction.

Figure 7:
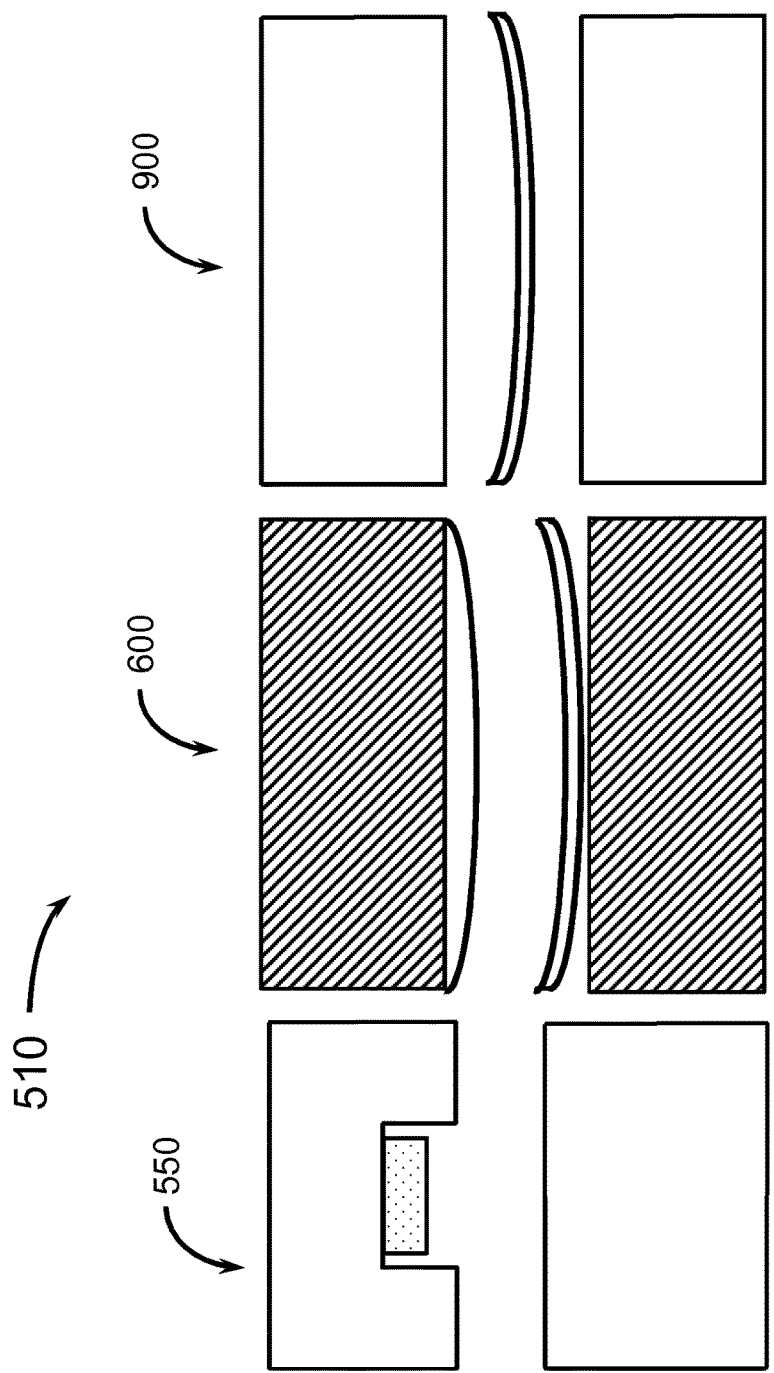
FIG. 7 illustrates a cross-sectional view of an exemplary embodiment of a glass production system.

FIG. 7 illustrates a cross-sectional view of an exemplary embodiment of a glass production system 510. The exemplary glass production system 510 may comprise a furnace 550, a bending apparatus 600, and a cooling apparatus 900. A glass article may be transported from the furnace 550 to the bending apparatus 600 to be shaped, and then to the cooling apparatus 900 to be cooled. There may be a transfer zone located between the furnace 550 and bending apparatus 600, and/or between the bending apparatus 600 and cooling apparatus 900. A transfer zone may also be located before the furnace 550 for loading glass articles into the glass production system 510, and after the cooling apparatus 900 to remove finished glass articles.

Figure 8:
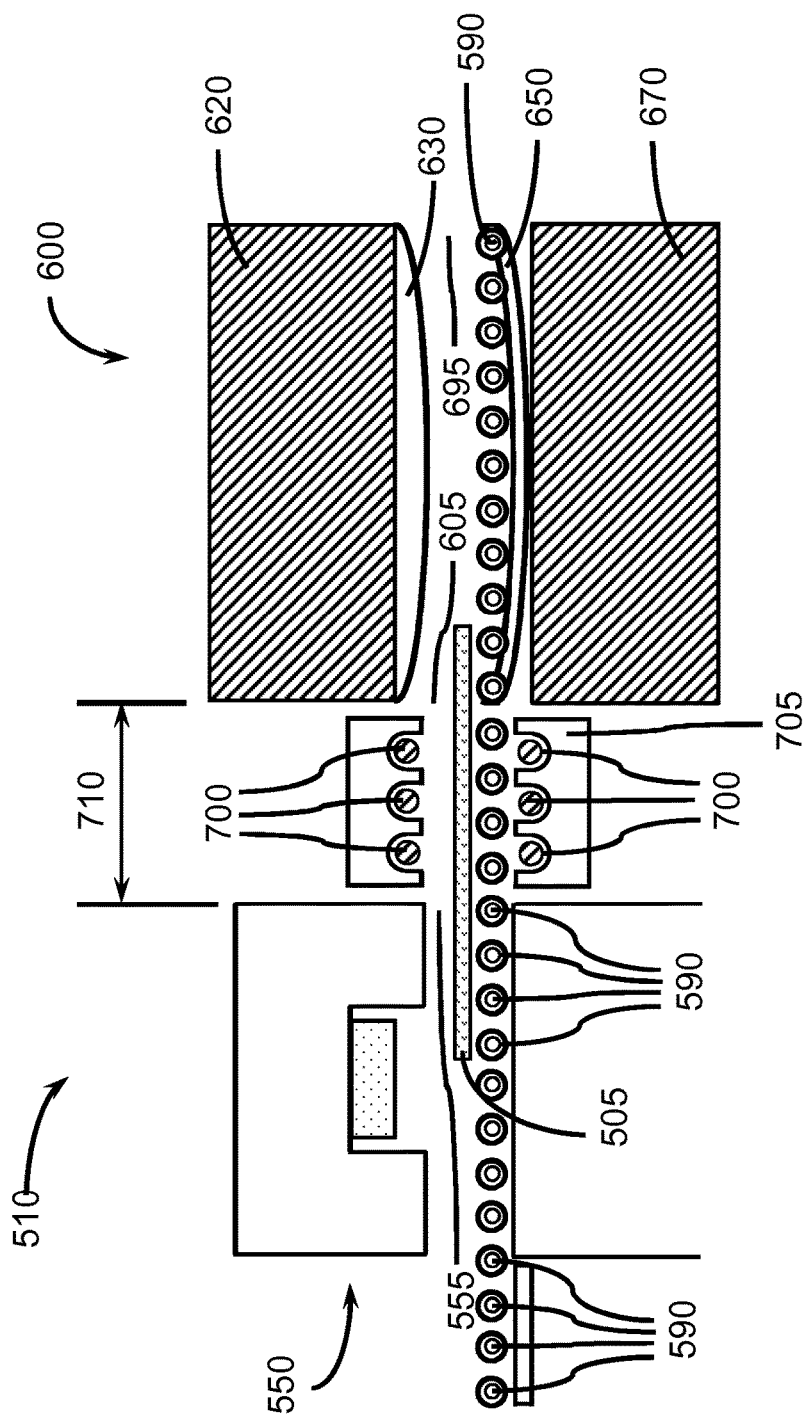
FIG. 8 illustrates a cross-sectional view of an exemplary embodiment of a glass production system.

FIG. 8 illustrates a cross-sectional view of an exemplary embodiment of a glass production system 510. The exemplary glass production system 510 may comprise a furnace 550, a bending apparatus 600, and a plurality of auxiliary heating elements 700. In various embodiments, the exemplary curved glass production system 510 may further comprise a cooling ring and/or a cooling apparatus. There may be gaps or transfer zones between the different modules (i.e., furnace 550, bending apparatus 600, cooling apparatus) of the curved glass production system 510.

It has been determined that with thinner glass sheets, for examples, glass sheets having a thickness less than 1.5 mm and less, specifically less than 1 mm, and more specifically less than 0.8 mm, the heat loss from the glass sheet is excessive. Changes in glass viscosity due to transfer zone ambient temperature(s) different from the heated glass article can create challenges for maintaining the glass viscosity within a workable range to form the glass properly and avoiding wrinkling which causes optical distortions, particularly for glass articles with a thickness of 1.5 mm or less. One such cause of these challenges is the insufficient thermal mass of thin glass sheets (i.e., ≤1.5 mm) to remain in a workable viscosity range. A solution to this challenge includes one or more heating elements positioned within each of the one or more transfer zone(s).

In some instances, the clearance distance between heating elements in a transfer zone and a major surface of a glass article may be too large to effectively and/or efficiently maintain the viscosity of the glass sheet 505 because of the spatial requirements of other apparatus components. A solution is to provide movement at least partially comprising a vertical component to the heating elements to accommodate the press mold, cooling ring, and/or other shaping equipment and components, while also providing sufficient heat to the glass article 5 as it is transferred from the glass heating zone of a furnace 550 to the forming zone within a bending apparatus 600. A mechanism may articulate the heating element(s) between a position near the glass sheet during the glass transfer process and provide for efficient heat transfer to the glass article surface from the heating element(s), and a position at a higher elevation, after the glass sheet passes under the heating element(s), which will allow space for downstream mechanical devices (i.e. press mold or other shaping equipment with moving parts), as needed.

In one or more embodiments, a curved glass production system 510 comprises a furnace 550 that may be configured to heat a glass article until it has a viscosity in the range of about $1\times10^{9.9}$ poise to about $1\times10^{12.6}$ poise. The furnace can have an exit opening from which the glass article 5 can leave the furnace. In various embodiments, the glass sheet 505 may be conveyed from the furnace exit opening to a bending apparatus 600 on one or more supports 590.

In one or more embodiments, the bending apparatus 600 may comprise an inlet end and an outlet end, wherein the inlet end and outlet end are configured and dimensioned to allow passage of a thin glass sheet, and a male bending form 630 and a female bending form 650. Supports 590 that convey a glass sheet 505 at least from the furnace 550 into the bending apparatus may be positioned along and form a transfer path for the glass article. In various embodiments, there are supports 590 within the bending apparatus 600, and the female bending form 650 may reside below the plane of the supports to provide clearance for a glass article to pass over the female bending form 650 on one or more supports 590, and into the bending apparatus 600. The bending apparatus 600 may also comprise an upper frame 620 that is connected to and supports the male bending form 630, and a lower frame 670 that is connected to and supports one or more of the supports 590, and/or the female bending form 650. The upper frame 620 and lower frame 670 may be connected to and/or operably associated with other frame components including but not limited to vertical, horizontal, and transverse structural frame members configured and dimensioned to provide support and structural rigidity, as would be known in the art. In various embodiments, the supports 590 may be secured to a base 680 with support brackets 596, where the base 680 may be affixed to the structural frame 610 of the bending apparatus 600.

In one or more embodiments, the supports 590 may be rollers and/or gas bearings, where a gas bearing may be a hydrostatic bearing that may utilize a gas to support the glass article on a thin film of the gas. In various embodiments, the gas may be air, nitrogen, hydrogen, helium, or combinations thereof. In various embodiments, the supports may comprise a combination of one or more rollers and one or more gas bearings. The supports may form a flat plane in which the glass article traverses the furnace 550, a gap 710, which may also be referred to as a transfer zone, and/or the bending apparatus 600, where the plane may be horizontal, transversely tilted, longitudinally inclined, or a combination of transversely tilted and longitudinally inclined.

In one or more embodiments, auxiliary heating elements 700 may be positioned above the plane of travel, below the plane of travel, or both above and below the plane of travel of the glass article.

In one or more embodiments, a heated gas bearing may be located above a plurality of supports 590, which are rollers that support the heated glass sheet 505 as it leaves the furnace exit opening 555 and moves to the bending apparatus entrance opening 605, where the heated gas bearing provides a flow of heated gas into a gap between a surface of the heated gas bearing and a major surface of the heated glass sheet to maintain the viscosity of the glass sheet and/or apply a gas pressure against the facing major surface of the heated glass sheet 505.

In one or more embodiments, a heated glass sheet 505 may travel at a velocity in the range of about 100 mm/sec to about 800 mm/sec, or about 200 mm/sec to about 800 mm/sec, or in the range of about 250 mm/sec to about 750 mm/sec, or in the range of about 500 mm/sec to about 750 mm/sec, or in the range of about 250 mm/sec to about 700 mm/sec, or in the range of about 600 mm/sec to about 750 mm/sec over the support(s) 590, as the glass article moves from the furnace exit opening 555 to the bending apparatus entrance opening 605. The velocity of the heated glass sheet 505 is one factor that determines the amount of time between when the heated glass sheet 505 leaves the furnace and when the heated glass sheet 505 is bent to a final shape, and thereby the amount of increase in viscosity.

In various embodiments, the gap 710 between the furnace exit opening 555 and the bending apparatus entrance opening 605 may be in the range of about 2.54 cm to about 100 cm, or about 2.54 cm to about 61 cm, or about 2.54 cm to about 30.5 cm, or about 5 cm to about 30.5 cm, or about 5 cm to about 15.25 cm.

In operation a heated glass sheet may be conveyed from the furnace 550 to the bending apparatus 600 on the supports 590, while compensating for heat loss from the glass article, so the viscosity of the glass article is maintained in the range of about $1\times10^{9.6}$ poise to about $1\times10^{11.5}$ poise. In various embodiments, the loss of heat from the glass article may be compensated by one or more auxiliary heating elements positioned in the gap 710 between the furnace exit opening 555 and the bending apparatus entrance opening 605. In various embodiments, the auxiliary heating elements 700 may be within a housing 705, where the housing 705 may direct heat from the heating elements towards the transfer path between the furnace 550 and the bending apparatus 600. In various embodiments, the one or more auxiliary heating elements 700 may extend across the direction of travel parallel to the long dimension of the furnace exit opening 555 and perpendicular to the direction of motion of the heated glass sheet. In various embodiments, the one or more auxiliary heating elements 700 may extend longitudinally along the direction of travel, and perpendicular to the long dimension of the furnace exit opening 555 and parallel to the direction of motion of the heated glass sheet. In various embodiments, the auxiliary heating elements 700 and furnace exit opening 555 may be oriented horizontally or tilted.

In one or more embodiments, one or more auxiliary heating element(s) 700 may supply sufficient heat to maintain the glass article at a viscosity of at least about $1\times10^{9.9}$ poise, or within a viscosity range of about $1\times10^{9.9}$ poise to about $1\times10^{12.6}$ poise, or in a range of about $1\times10^{9.9}$ poise to about $1\times10^{11.5}$ poise, or in a range of about $1\times10^{9.9}$ poise to about $1\times10^{11}$ poise, or in a range of about $1\times10^{10}$ poise to about $1\times10^{11}$ poise. In various embodiments, the heating element(s) have a thermal output sufficient to provide a heat flux through conduction, convection, and/or radiation sufficient to compensate for the amount of heat emitted by the glass article at least for the time that the glass article is between the furnace 550 and the bending apparatus 600. In various embodiments, a heating element may be an electrically resistive heating element, a gas-fired heating element, and/or a radiative heating element.

In various embodiments, the electrically resistive heating element may be a metal (e.g. nichrome, cupronickel, or kanthal), a ceramic (e.g., molybdenum disilicide ($MoSi_2$) or silicon carbide (SiC)), or a composite comprising electrically resistive heating element within a housing. In various embodiments, the radiative heating element may comprise tungsten wire, carbon, kanthal, or may be quartz/halogen, or radiant tube gas-fired heating elements.

In one or more embodiments, the glass article may be a thin glass sheet, wherein a thin glass sheet has a thickness of 1.5 mm or less. In various embodiments, the thin glass sheet may have a thickness in the range of about 0.1 mm to about 1.5 mm, or in the range of about 0.1 mm to about 1.4 mm, or in the range of about 0.1 mm to about 1.3 mm, or in the range of about 0.1 mm to about 1.2 mm, or in the range of about 0.1 mm to about 1.1 mm, or in the range of about 0.1 mm to about 1.0 mm, or in the range of about 0.1 mm to about 0.9 mm, or in the range of about 0.1 mm to about 0.8 mm, or in the range of about 0.1 mm to about 0.7 mm, or in the range of about 0.1 mm to about 0.6 mm, or in the range of about 0.1 mm to about 0.5 mm, or in the range of about 0.1 mm to about 0.4 mm.

In one or more embodiments, a thin glass sheet having a thickness in the range of about 0.1 mm to about 1.5 mm, or in the range of about 0.1 mm to about 1.4 mm, or in the range of about 0.1 mm to about 1.3 mm, or in the range of about 0.1 mm to about 1.2 mm, or in the range of about 0.1 mm to about 1.1 mm, or in the range of about 0.1 mm to about 1.0 mm, or in the range of about 0.1 mm to about 0.9 mm, or in the range of about 0.1 mm to about 0.8 mm, or in the range of about 0.1 mm to about 0.7 mm, or in the range of about 0.1 mm to about 0.6 mm, or in the range of about 0.1 mm to about 0.5 mm, or in the range of about 0.1 mm to about 0.4 mm may be maintained at a viscosity in the range of about $1 \times 10^{9.9}$ poise to about $1 \times 10^{12.6}$ poise, or in a range of about $1 \times 10^{9.9}$ poise to about $1 \times 10^{11.5}$ poise, or in a range of about $1 \times 10^{9.9}$ poise to about $1 \times 10^{11}$ poise, or in a range of about $1 \times 10^{10}$ poise to about $1 \times 10^{11}$ poise, or at a viscosity of at least about $1 \times 10^{9.9}$ poise.

In one or more embodiments, the glass of the glass article or sheet may be composed of a soda-lime glass, a borosilicate glass, or an aluminosilicate glass.

In one or more embodiments, multiple thin glass sheets may be stacked, aligned, and introduced into the bending apparatus at the same time. The multiple sheets may be shaped together at one time by the bending apparatus.

In one or more embodiments, a bending apparatus 600 may comprise a bending apparatus entrance opening 605 configured and dimensioned to allow passage of one or more thin heated glass sheet(s), and a bending apparatus exit opening 695 configured and dimensioned to allow passage of one or more thin heated glass sheet(s), where the thin glass sheet(s) may enter the bending apparatus 600 at the bending apparatus entrance opening 605 and leave the bending apparatus at the exit opening 695. In various embodiments, the bending apparatus exit opening 695 may be opposite the bending apparatus entrance opening 605, or the bending apparatus exit opening 695 may be at an angle or orthogonal to the bending apparatus entrance opening 605.

In various embodiments, the bending apparatus 600 may shape about 1 to 10 glass articles each minute, or about 2 to 10 glass articles per minute, or about 6 to 10 glass articles per minute, where each glass article may be shaped in about 6 seconds to about 60 seconds, or about 6 seconds to about 30 seconds, or about 6 seconds to about 10 seconds.

Figure 9:
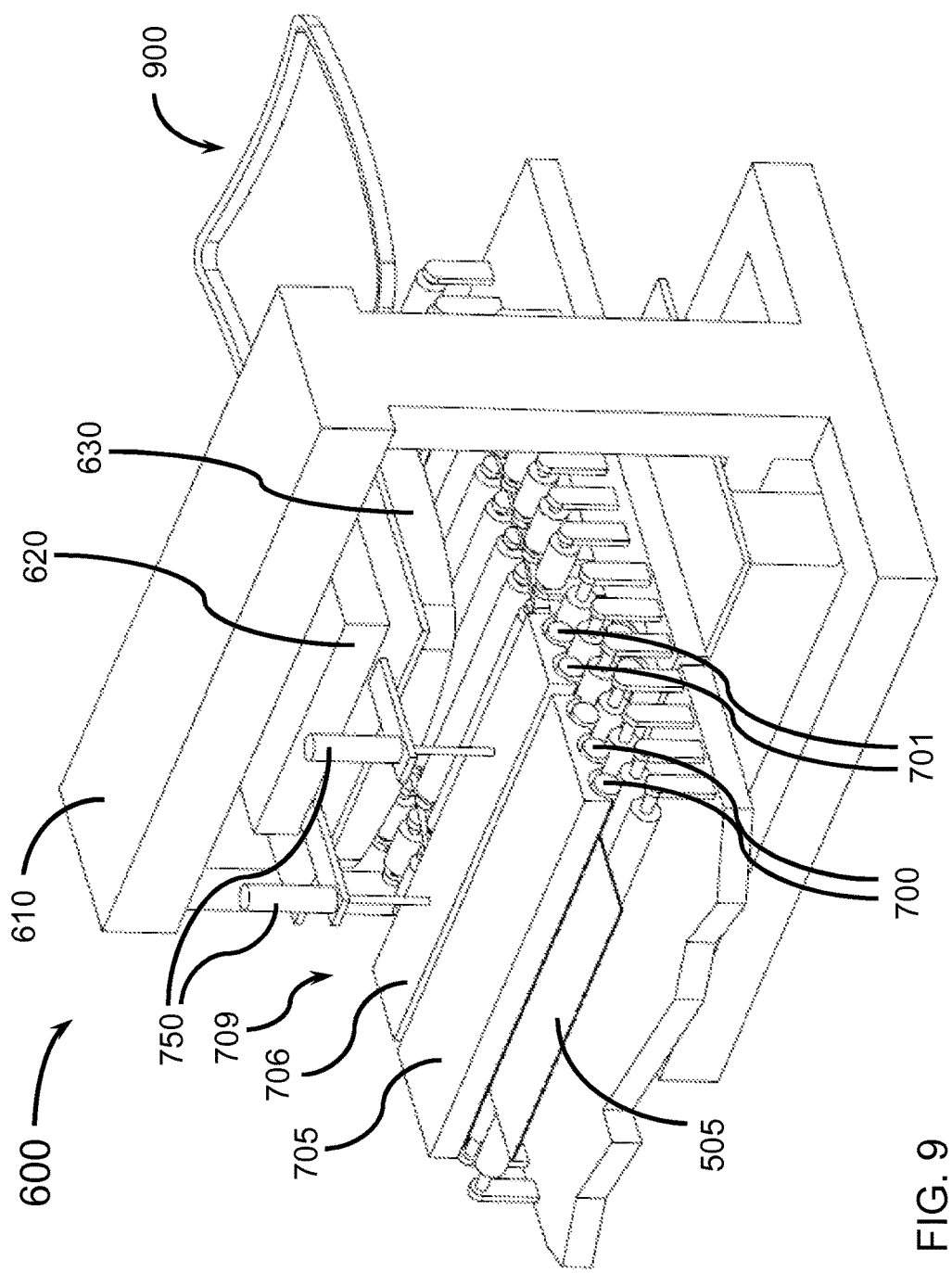
FIG. 9 illustrates a perspective view of an exemplary embodiment of a bending apparatus.

FIG. 9 illustrates a perspective view of an exemplary embodiment of a bending apparatus 600.

In one or more embodiments, the bending apparatus 600 may comprise a structural frame 610 that comprises one or more frame members configured, dimensioned, and arranged to provide support and spatial arrangement to the various components making up the bending apparatus 600.

A cooling ring 800 is shown towards the exit side of the bending apparatus 100, which may receive and support a thin glass sheet after a forming operation. In one or more embodiments, the cooling ring 800 may be connected to a support frame 850 (see FIG. 11), where the support frame may ride upon rails and/or rollers to shuttle between a receiving position below and suitably aligned with the male bending form 630 and a cooling apparatus 900 (see FIG. 11). The cooling ring 800 may transport the now bent thin glass sheet from the bending apparatus 600 to a cooling or cooling apparatus 900 for subsequent heat treatment. In various embodiments, a cooling apparatus 900 may comprise a plurality of gas jets 910 arrayed above the cooling ring 800, below the cooling ring 800, or both, that direct a cooling gas towards the thin glass sheet for controlled cooling, where the position and/or direction of the plurality of gas jets forms a cooling zone within the cooling apparatus.

In one or more embodiments, a heating element drive mechanism 750 may be operatively associated with one or more auxiliary heating elements 701, wherein the heating element drive mechanism 750 provides the one or more auxiliary heating elements 701 a range of motion, which may include vertical movement. In addition, there may be one or more fixed auxiliary heating elements 700 that remain at an intended position a fixed distance above the plane of the supports 590. An auxiliary heater 709 comprising one or more auxiliary heating elements 701 in a movable housing 706 can be able to move up and down during at least a portion of a bending operation to accommodate the male and/or female mold forms, cooling ring, or other shaping equipment and components, while also providing sufficient heat to the glass article as it is transferred from the glass heating zone of the furnace to the forming zone of the bending apparatus 600. In various embodiments, the vertical range of motion of the heating elements may be in the range of about 125 mm (about 5 in.) to about 356 mm (about 14 in.), or about 203 mm (about 8 in.) to about 305 mm (about 12 in.). In various embodiments, the movement of the heating elements may be in a plane normal to the direction of motion of the heated glass sheet. In various embodiments, the movement of the heating elements may be in an arc or at an angle to the direction of motion of the heated glass sheet, where at least a component of the movement is away from the plane of travel, for example a vertical component (i.e., a vector component).

In various embodiments, the auxiliary heating elements and/or moveable housing may be configured to be about 5 mm to about 30 mm, or about 10 mm to about 30 mm, or about 15 mm to about 30 mm from a major surface of the heated glass sheet during transfer of the heated glass sheet from the furnace exit opening 555 to the bending apparatus entrance opening 605.

In one or more embodiments, movement of one or more moveable auxiliary heating elements 701 within a transfer zone may be accomplished through a heating element drive mechanism 750 comprising a motor and mechanical linkage to produce a rotary to linear motion, a mechanical linear actuator, or a pneumatic linear actuator, where the mechanical linkage and drive, mechanical linear actuator, or pneumatic linear actuator is operably associated with the auxiliary heater 709 and/or one or more heating elements, and configured to provide a range of movement.

In one or more embodiments, a heating element drive mechanism 750 may connect a moveable housing 706 to an upper frame 620, where the heating element drive mechanism 750 may be connected to the upper frame 620 by a mechanical coupling 755, for example one or more bars, brackets, rods, beams, etc. In various embodiments, the one or more auxiliary heating elements 700, 701 may be mounted in the housing(s) 705, 706 that is configured and dimensioned to receive one or more auxiliary heating elements 700, 701, and comprises suitable mechanical supports and electrical connectors to hold and provide power connections to the one or more auxiliary heating elements 700, 701. Electrical power may be provided to the one or more heating elements through the electrical connectors. Moveable housing 706 and auxiliary heating elements 701 may be moved vertically by the heating element drive mechanism 750 to provide sufficient clearance for a cooling ring 800, a support frame 850, and/or a shuttle rail 880, when the cooling ring 800 moves into a receiving position below and suitably aligned with the male bending form 630. In various embodiments the heating element drive mechanism 750 may be a linear drive mechanism, for example a linear actuator including but not limited to a linear motor, direct drive motor and ball screw, pneumatic, hydraulic, or electromagnetic linear actuators, and pneumatic or hydraulic cylinders.

Figure 10:
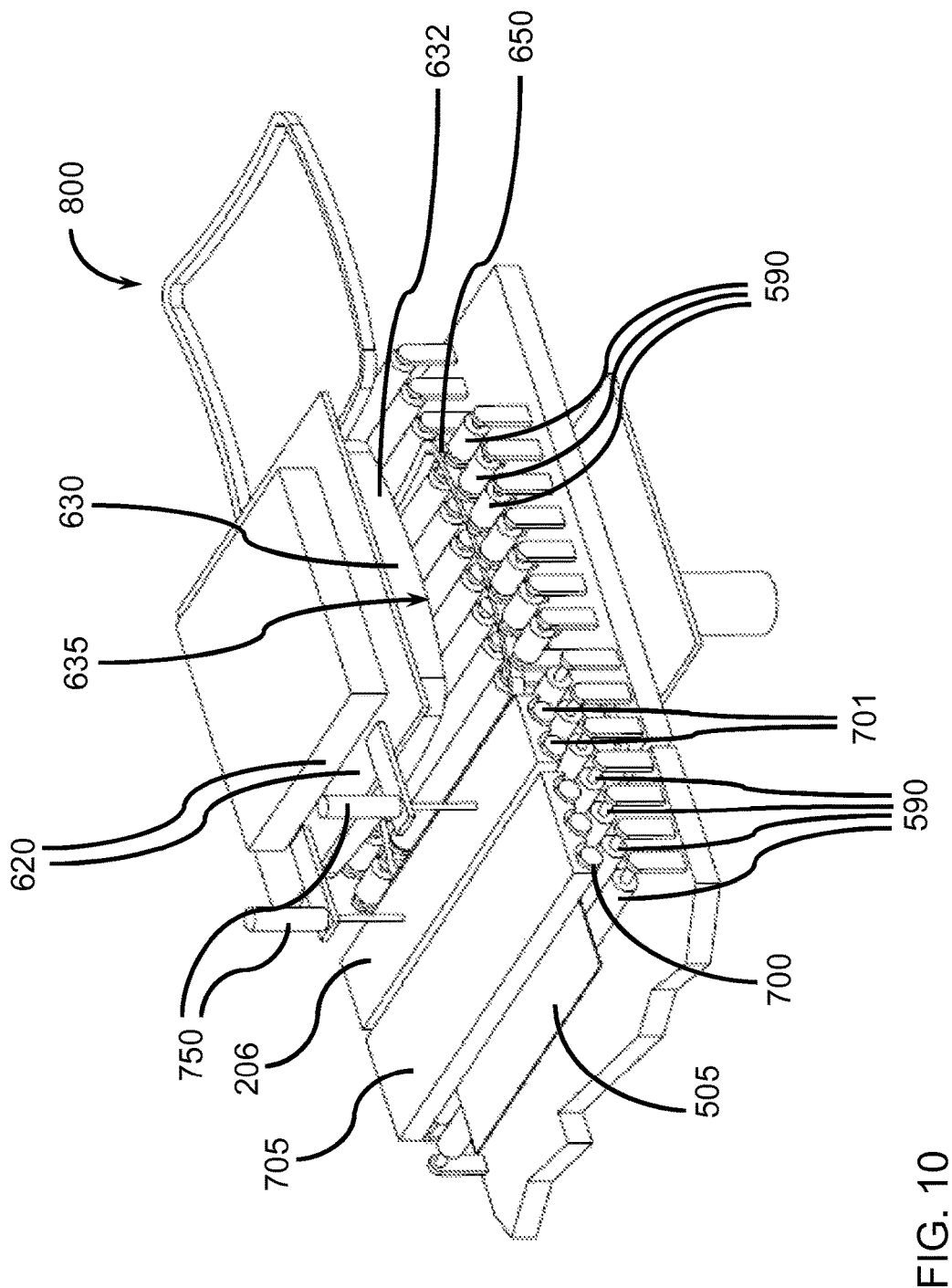
FIG. 10 illustrates a perspective view of an exemplary embodiment of a bending apparatus that does not show a support frame of the apparatus.

FIG. 10 illustrates a perspective view of an exemplary embodiment of a bending apparatus 600 that does not show a structural frame 610 of the apparatus.

In one or more embodiments, a male bending form 630 may comprise a male form body 632 having a male bending form surface 635 with a central portion and a peripheral portion, where the male bending form surface 635 may face a female bending form 650. In various embodiments, the male bending form surface is curved, where the curvature of the surface is intended to impart a matching shape to a glass article. In various embodiments, the curvature of the male bending form surface may be concave, convex, a compound curve, a saddle, a complex curve, or combinations thereof. In various embodiments, the configuration, dimensions and positioning of the male bending form and female bending form define a forming zone within the bending apparatus.

In one or more embodiments, the male form body 632 may comprise a hollow interior area, where the hollow interior area may house one or more heating elements to heat the male bending form surface 635. In various embodiments, the male bending form 630 may comprise a plurality of mold heating elements arranged within the male form body 632 and in thermal contact with the male bending form surface 635, wherein the one or more heating elements may be controlled to heat the central portion of the male bending form surface 635 to a higher temperature than the peripheral portion of the male bending form surface 635. In various embodiments, the delta temperature of the central portion of the male bending form surface 635 may be in the range of about 30° C. to about 100° C. greater than the temperature of the peripheral portion of the male form surface.

According to one or more embodiments, a feedback control system may be used to accurately control the male bending form heating elements to maintain the intended surface temperature(s) to facilitate bending while avoiding optical distortions caused by glass sheet overheating and/or breakage due to under-heating. In one or more embodiments, one or more thermocouples may be used to monitor and maintain the temperature of the male bending form surface 635, and a temperature gradient between the peripheral portion and the central portion of the male bending form surface 635.

Figure 11:
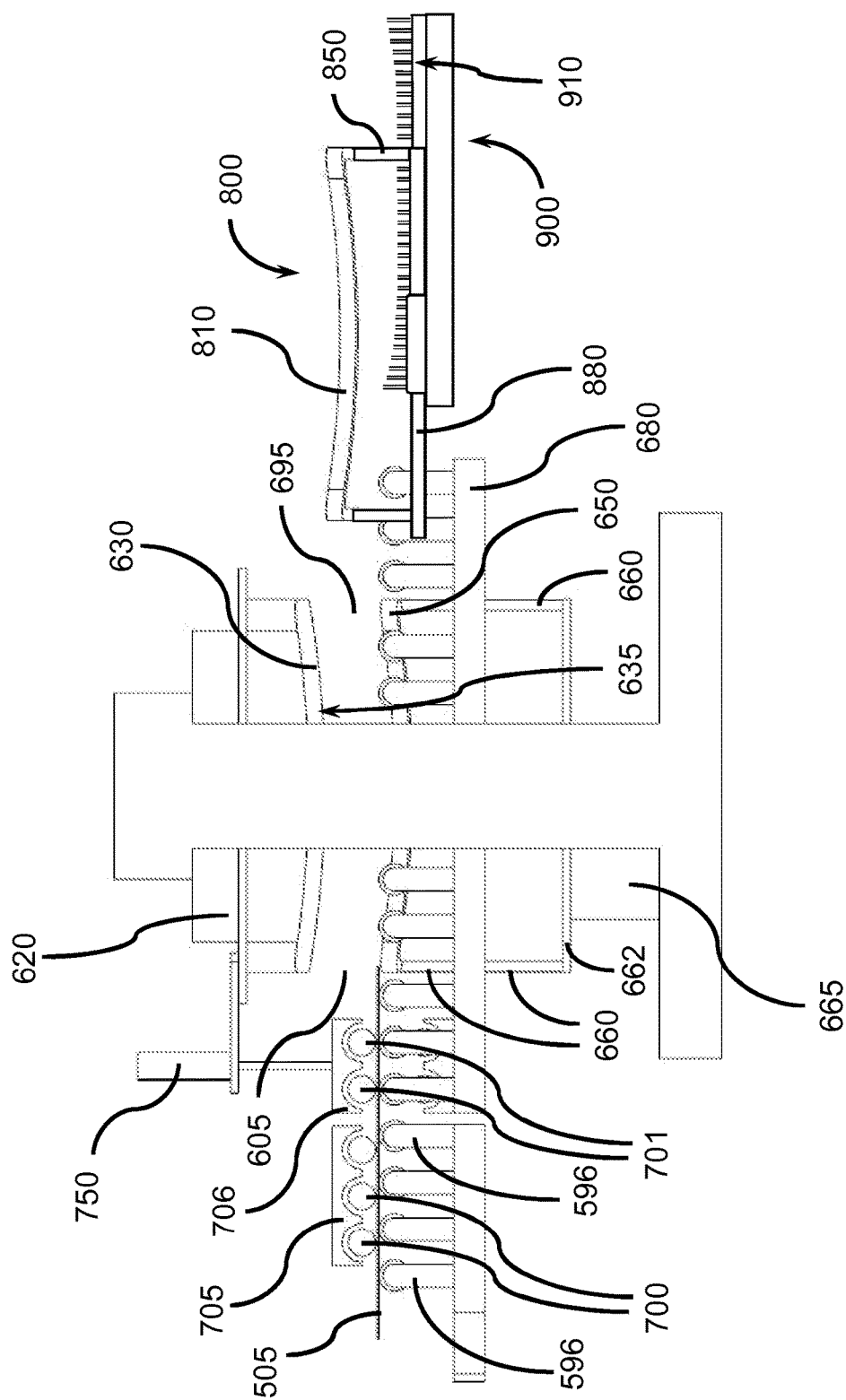
FIG. 11 illustrates a side view of an exemplary embodiment of a bending apparatus and cooling apparatus.

FIG. 11 illustrates a side view of an exemplary embodiment of a bending apparatus 600.

In one or more embodiments, a glass sheet 505, which may be a flat glass sheet having two major surfaces with a thickness there-between, may pass between a plurality of auxiliary heating elements 700, 701 (heating elements below the plane of travel are illustrated, but hidden behind the support brackets 596 of the supports 590), while being propelled along a direction of travel by one or more support(s) 590. In various embodiments, the heating elements below the plane of travel may be positioned below the supports 590, and may be positioned about 90 mm to about 100 mm, or about 90 mm to about 110 mm from a major surface of the heated glass sheet during transfer of the heated glass sheet from the furnace exit opening 555 to the bending apparatus entrance opening 605. In various embodiments, the heating elements below the plane of travel may be positioned between the supports 590, and may be positioned about 5 mm, or about 5 mm to about 30 mm, or about 10 mm to about 30 mm, or 15 mm to 30 mm, or 20 mm to 75 mm from a major surface of the heated glass sheet during transfer of the heated glass sheet from the furnace exit opening 555 to the bending apparatus entrance opening 605. The glass sheet 505 may decelerate within bending apparatus 600 such that the glass sheet 505 is positioned above and aligned with the female bending form 650 in synchronization with the female bending form 650 lifting the glass article from the supports.

In various embodiments, the female bending form 650 may be operatively associated with a female bending form drive 665 that imparts linear motion to the female bending form 650, so the female bending form 650 may move vertically between a receiving position, where an upper edge of the female bending form 650 is below the upper plane of the support(s) 590, and a forming position, where the female bending form 650 operatively engages the male bending form 630 to produce a bend in the glass sheet 505. In various embodiments, the female bending form 650 may be connected to a female bending form drive 665 by a lower frame 662 and one or more post(s) 660. In various embodiments, the female bending form drive 665 may be an electric motor, or a gas or hydraulic cylinder that provides reciprocal movement to the female bending form 650.

In one or more embodiments, the one or more auxiliary heating element(s) 700, 701 located above the plane of travel may be positioned about 5 mm, or about 5 mm to about 30 mm, or about 10 mm to about 30 mm, or 15 mm to 30 mm from a major surface of the heated glass sheet during transfer of the heated glass sheet from the furnace exit opening 555 to the bending apparatus entrance opening 605.

In one or more embodiments, the male bending form 630 comprises a plurality of orifices in the male bending form surface 635 through which a vacuum may be applied. In various embodiments, the plurality of orifices provide air passages for application of a vacuum to an interface formed between the contact surface of the male bending form 630 and a major surface of the thin glass sheet. The orifices may be connected to and in fluid communication with a vacuum source that can evacuate a gas at the interface and in the orifices. The vacuum force may be applied to a glass sheet 505 when the softened glass article comes into contact with the male bending form surface 635, and cause the bent glass article to adhere to the male bending form surface 635. The female bending form 650 may retract from the forming position back to a receiving position, after the glass article has been bent to the intended shape, leaving the bent glass article adhering to the surface of male bending form 630 above the plane of travel. In various embodiments, the male bending form 630 and an adhering glass article may remain sufficiently above the supports 591, 592 to provide clearance for a cooling ring 800 to move from a cooling position to a receiving position inside the bending apparatus 600.

In one or more embodiments, the cooling ring 800 is supported by a support frame 850 that rides along one or more shuttle rails 880 between a cooling apparatus 900 and the bending apparatus 600, where the cooling ring 800 and support frame 850 enters the bending apparatus 600 through the bending apparatus exit opening 695. In various embodiments, the bending apparatus entrance opening 605 and/or bending apparatus exit opening 695 may be configured and dimensioned to allow passage of the cooling ring 800, support frame 850, shuttle rails 880, or combination thereof. In various embodiments, the frame of the cooling ring 800 may extend beyond the bending apparatus entrance opening 605, and may collide and/or interfere with one or more of the auxiliary heating elements 701 and/or moveable housing 706.

In one or more embodiments, the vacuum to the male bending form 630 may be released to allow the bent glass article to drop onto an upper surface of the cooling ring 800. In various embodiments, the male bending form 630 may remain in a fixed position when the vacuum is released and the bent glass article is dropped onto the cooling ring 800. In various embodiments, the male bending form 630 may move vertically to reduce the distance between the male bending form surface 635 and the upper surface of the cooling ring 800, where the bent glass article may be dropped from a reduced height or placed on the upper surface of the cooling ring 800.

Figure 12:
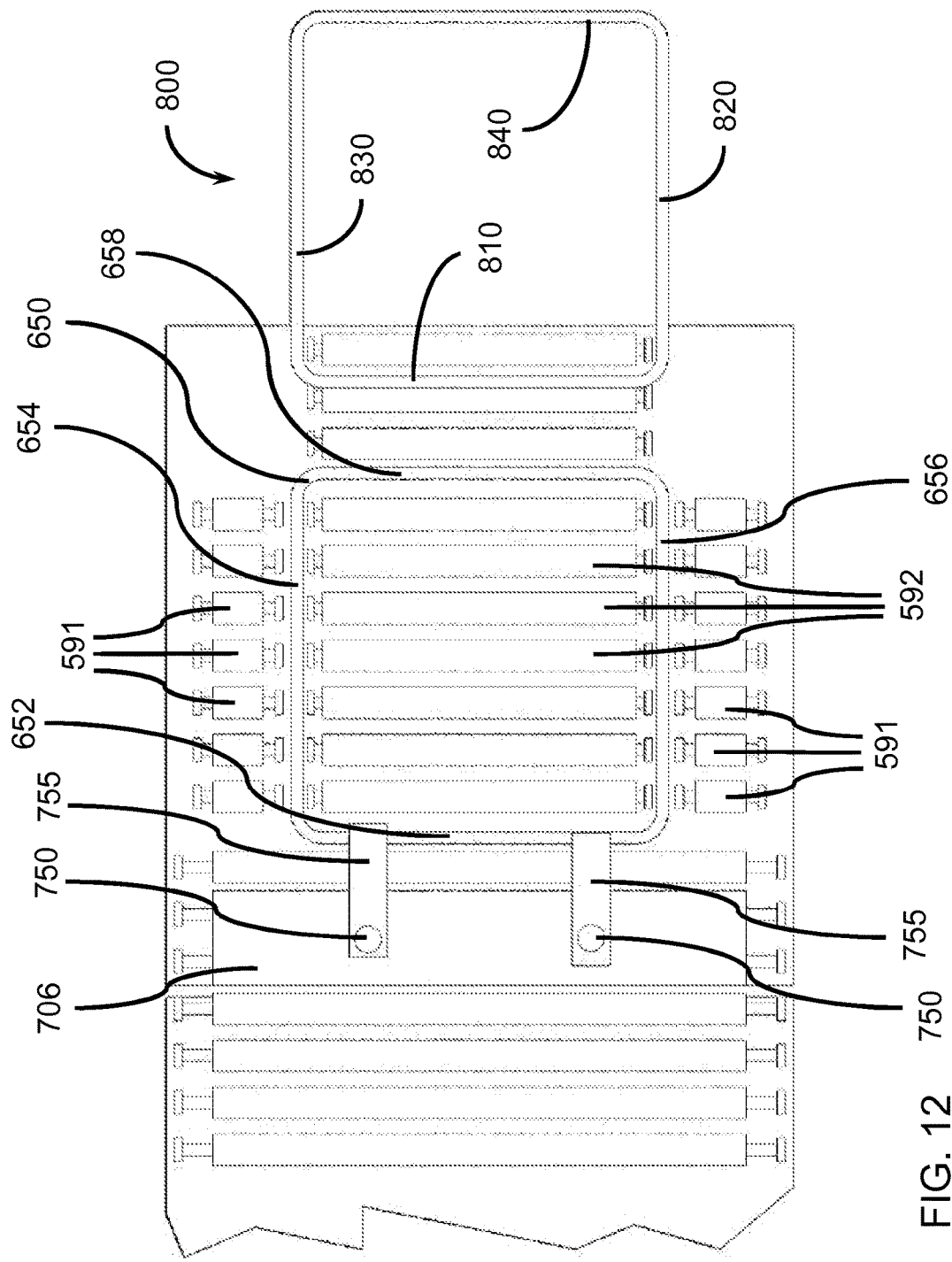
FIG. 12 illustrates a top view of an exemplary embodiment of a bending apparatus.

FIG. 12 illustrates a top view of an exemplary embodiment of a bending apparatus 600.

In one or more embodiments, one or more of the supports 590 may be segmented to provide exterior support(s) 591 that are outside of the boundary formed by the female bending form 650, and interior support(s) 592 that are located within the boundary formed by the female bending form 650, wherein a glass article may be supported by at least the one or more interior support(s) 592, as the glass article is conveyed into position within the bending apparatus 600. The female bending form 650 may move vertically to pick up the glass article. In various embodiments, the female bending form may move a sufficient distance to press the glass article against at least a portion of the male bending form surface 635. In various embodiments, the female bending form may slow down or stop moving before contacting the male bending form surface 635, and the male bending form may move vertically to press against the glass article.

In one or more embodiments, the female bending form 650 may comprise one or more bending form structural member(s) also referred to as bending form structural members 652, 654, 156, 158 that are configured and dimensioned to support at least a portion of the periphery of the heated glass sheet, while providing an opening in at least a middle portion. In various embodiments, the one or more bending form structural member(s) or bending form structural members forming the female bending form 650 may be contiguous to form a closed ring having one or more contact surfaces facing a male bending form surface 635 and an opening in at least a middle portion of the ring. The opening in the heated ring may be configured and dimensioned to accept a portion of the glass article and male bending form 630, when the glass article engages at least a portion of the male bending form surface 635. In various embodiments, the one or more structural member(s) or bending form structural members forming the female bending form 650 may be segmented, such that there are intervening spaces between the ribs where there is no surface to support a glass article. In various embodiments, the female bending form 650 has a top surface that comes into contact and supports the periphery of the glass sheet, and upon which at least a portion of a flat glass sheet rests. In various embodiments, one or more of the bending form structural members 652, 654, 656, 658 that make up the female bending form 650 may be straight and provide a flat, top surface to support at least a portion of the weight of a glass article along a periphery of the glass article, and one or more of the bending form structural members 652, 654, 656, 658 are in the form of ribs that make up the female bending form 650 may be curved, where the curvature of the one or more of the rib(s)corresponds to the intended curvature of the final bent glass article.

In one or more embodiments, the female bending form 650 comprises a ring comprising a number of bending form ribs equal to or greater than two, and one or more heating element(s), wherein the number of bending form ribs are configured and dimensioned to support the periphery of the thin glass sheet and at least one of the one or more heating elements is operatively associated with one of the ribs.

In one or more embodiments, the bending form structural members 652, 654, 656, 658 that make up the female bending form 650 may have a width in the range of about 3 mm to about 30 mm, or in the range of about 6 mm to about 30 mm, or in the range of about 12 mm to about 30 mm, or in the range of about 20 mm to about 30 mm, where the width of the bending form structural members 652, 654, 656, 658 determines the area of the top surface of the female bending form 650 that can come into contact with a glass article. In various embodiments, the bending form structural members 652, 654, 656, 658 that make up the female bending form 650 may have a square, rectangular, triangular, hexagonal or other polygonal cross-section, an L-shape or Π-shape. In various embodiments, heating elements 690 may be affixed to and in thermal contact with a bottom or side surface of the bending form structural members 652, 654, 656, 658 in the form of ribs. The heat produced by each of the female bending form heating elements 690 associated with the female bending form 650 may be individually controlled to maintain the viscosity at the periphery of the glass article in a range suitable for bending while reducing the extent of optical distortions and/or wrinkling imparted to the glass article. In various embodiments, the female bending form heating elements may be configured to maintain the viscosity of the periphery of a glass article in a range of about $1 \times 10^{12.6}$ poise to about $1 \times 10^{11.5}$ poise.

In one or more embodiments, the bending apparatus further comprises a thermal sensor operatively associated with the heated female bending form, and a controller in electrical communication over a communication path with the thermal sensor, wherein the heated female bending form has a surface that comes into contact and supports the periphery of the heated glass sheet and the thermal sensor is configured to measure the temperature of at least the female bending form surface in contact with the periphery of the heated glass sheet, and may communicate the measured temperature to the controller in a feedback loop.

In one or more embodiments, the one or more contact surfaces of a female bending form 650 contacts a periphery of a major face of a glass article and lifts the glass article to make contact with the male bending form 630. In various embodiments, the male bending form 630 does not move during a forming operation. In various embodiments, the glass article is pressed against a heated male bending form surface 635, where there is a gradient between the periphery and the central portion of the male bending form surface 635, such that the periphery of the male bending form surface 635 is cooler than the central portion of the male bending form surface 635. In various embodiments, the periphery of the male bending form surface 635 is at a temperature that maintains the viscosity of the periphery of the glass article in a range of about $1\times10^{12.6}$ poise to about $1\times10^{11.5}$ poise, and the central portion of the male bending form surface 635 is at a temperature that maintains the viscosity of the central portion of the glass article in a range of about $1\times10^{9.9}$ poise to about $1\times10^{11}$ poise. In various embodiments, the viscosity of the periphery of the glass article is maintained at about $1\times10^{12.6}$ poise and the viscosity of the central portion of the glass article is maintained at about $1\times10^{9.9}$ poise with a viscosity gradient there-between during a forming operation. In various embodiments, portions of a glass article to have sharper bends are heated to a temperature that produces a viscosity in a range of about $1\times10^{9.9}$ poise to about $1\times10^{11}$ poise by the heated male bending form surface 635. The heated male bending form surface 635 may create a differential viscosity profile in the thin glass by controlling the heat produced by each of the heating elements with a controller.

In one or more embodiments, the bending form structural members 652, 654, 656, 658 of the female bending form 650 are heated to a temperature that maintains the viscosity of the periphery of the glass article in a range of about $1\times10^{12.6}$ poise to about $1\times10^{11.5}$ poise.

A cooling ring 800, shown towards an exit side of the bending apparatus 600, may move horizontally into the bending apparatus 600, and be positioned below and aligned with the male bending form 630 to receive a now-bent glass article. In one or more embodiments, the cooling ring 800 may comprise one or more cooling ring structural member(s) or cooling ring rib(s) 810, 820, 830, 840 that support at least a portion of the periphery of the heated glass sheet.

In various embodiments, the cooling ring 800 may be heated, where heating may be accomplished by one or more cooling ring heating elements 860 operatively associated and in thermal contact with the cooling ring rib(s) 810, 820, 830, 840 of the cooling ring 800. In various embodiments, the heated cooling ring 800 may control the rate of cooling of a glass article after shaping at least around a periphery of the bent glass article. In various embodiments, by providing a heated cooling ring 800 and controlling the cooling of the bent glass article as it is transferred from a bending apparatus, the glass production system 510 can maintain a high rate of throughput because the bending apparatus 600 does not need to be slowed down to avoid thermal shock to the glass article when it is transferred to the cooling ring 800.

Figure 13:
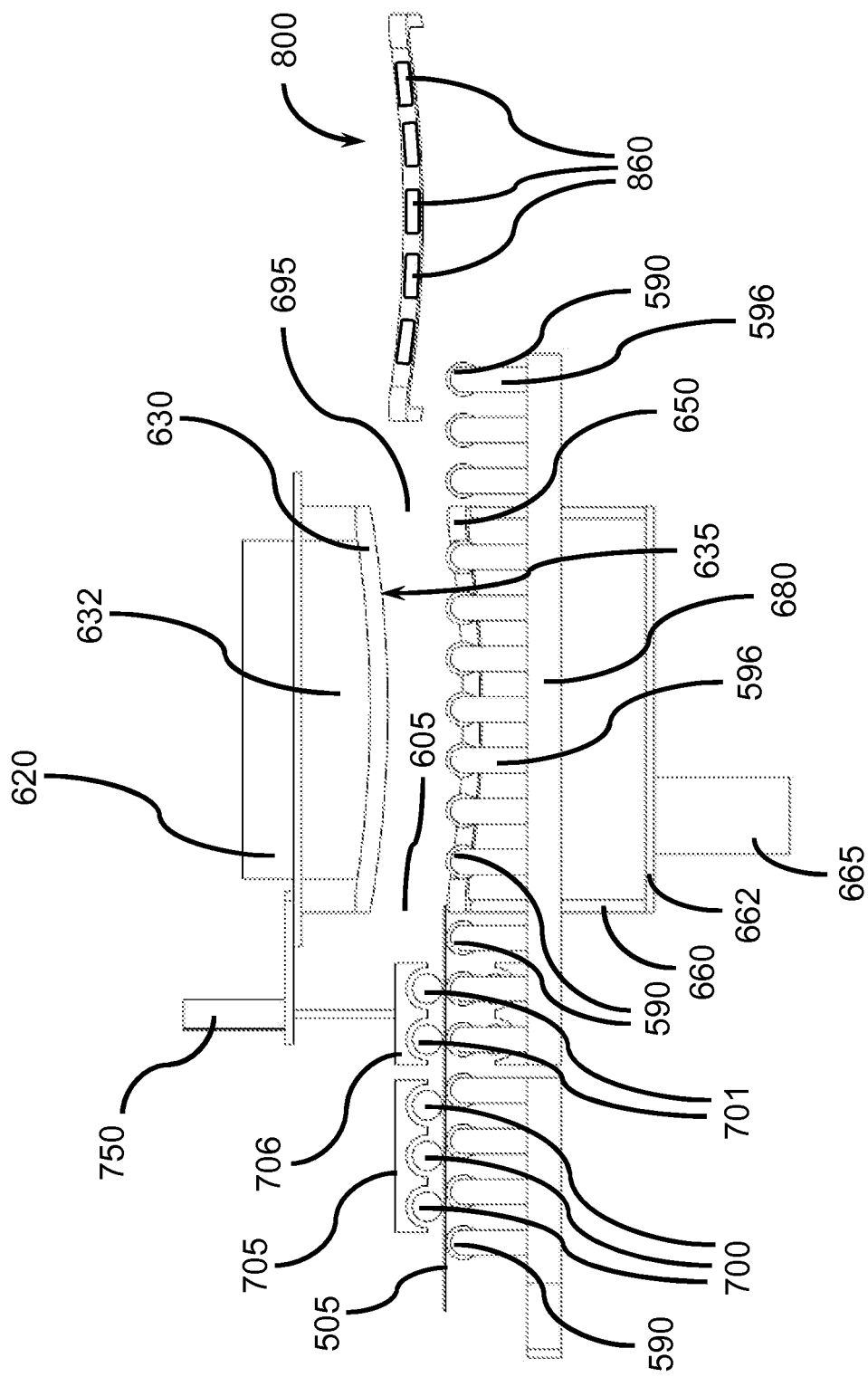
FIG. 13 illustrates a side view of an exemplary embodiment of a bending apparatus that does not show a support frame of the apparatus.

FIG. 13 illustrates a side view of an exemplary embodiment of a bending apparatus 600 that does not show a support frame of the apparatus.

In one or more embodiments, one or more auxiliary heating elements 200, 701 provide(s) a heat flux to the heated glass sheet 505 sufficient to maintain the viscosity of the heated glass sheet in the range of about $1\times10^{9.9}$ poise to about $1\times10^{12.6}$ poise, or in the range of about $1\times10^{9.9}$ poise to about $1\times10^{11.5}$ poise, or in the range of about $1\times10^{9.9}$ poise to about $1\times10^{11}$ poise during transfer of the heated glass sheet from the furnace exit to the bending apparatus entrance opening 605. In various embodiments, where the heat flux may be determined based on the mass of the glass sheet, the speed at which the glass sheet travels, and/or the size of the transfer zone.

In one or more embodiments, the flat glass sheet may ride upon a plurality of supports 90 as it travels into and/or through the bending apparatus 600. The flat glass sheet's forward motion may be slowed as it comes into positioned above and aligned with the female bending form 650, where the supports may slow the forward motion of the glass sheet 505 in synchronization with the vertical motion of the female bending form 650, so the female bending form 650 lifts the glass sheet 505 from the supports as the glass sheet 505 is coming to a complete stop. In embodiments in which the supports are a series of rollers arranged in a sequential fashion, so at least a majority of the glass sheet's weight and surface area rests upon a plurality of rollers, the rollers may be driven by a suitable drive mechanism (e.g., chain, shaft, servo-motor, etc.), as would be known in the art, and slow their rotation when the glass sheet has travelled an intended distance into the bending apparatus to decelerate the glass sheet 505. Bumpers at one end of the female bending form 650 may provide a fixed position and surface against which the glass sheet stops as the sheet is being lifted. In embodiments in which the supports may be gas bearings supporting at least a majority of the glass sheet's weight and surface area, the sheet's forward motion may be slowed or stopped by a break mechanism.

In one or more embodiments, the female bending form 650 comprises a bending form structural member(s) 652, 654, 656, 658 forming a ring with a central portion and a peripheral portion opposite the male mold form, wherein the female bending form 650 contact surface and the male mold contact surface are configured and dimensioned to have the intended shape of the bent glass article.

In one or more embodiments, the female bending form 650 may be heated, where heating may be accomplished by one or more female bending form heating elements 690 operative associated and in thermal contact with the female bending form 650. In various embodiments, the female bending form heating element(s) 690 may be ceramic, wire, or other heating elements known in the art.

In various embodiments, the female bending form 650 will rise up to receive the glass sheet 505 on at least a portion of the upper surface of the one or more structural member(s) or rib(s) forming the female bending form 650. Where at least some of the structural member(s) are curved to have the desired final shape of the bent glass sheet, the flat glass sheet FIG. 14 illustrates a perspective view of an exemplary embodiment of a bending apparatus 600 from an entrance side of the apparatus.

Figure 14:
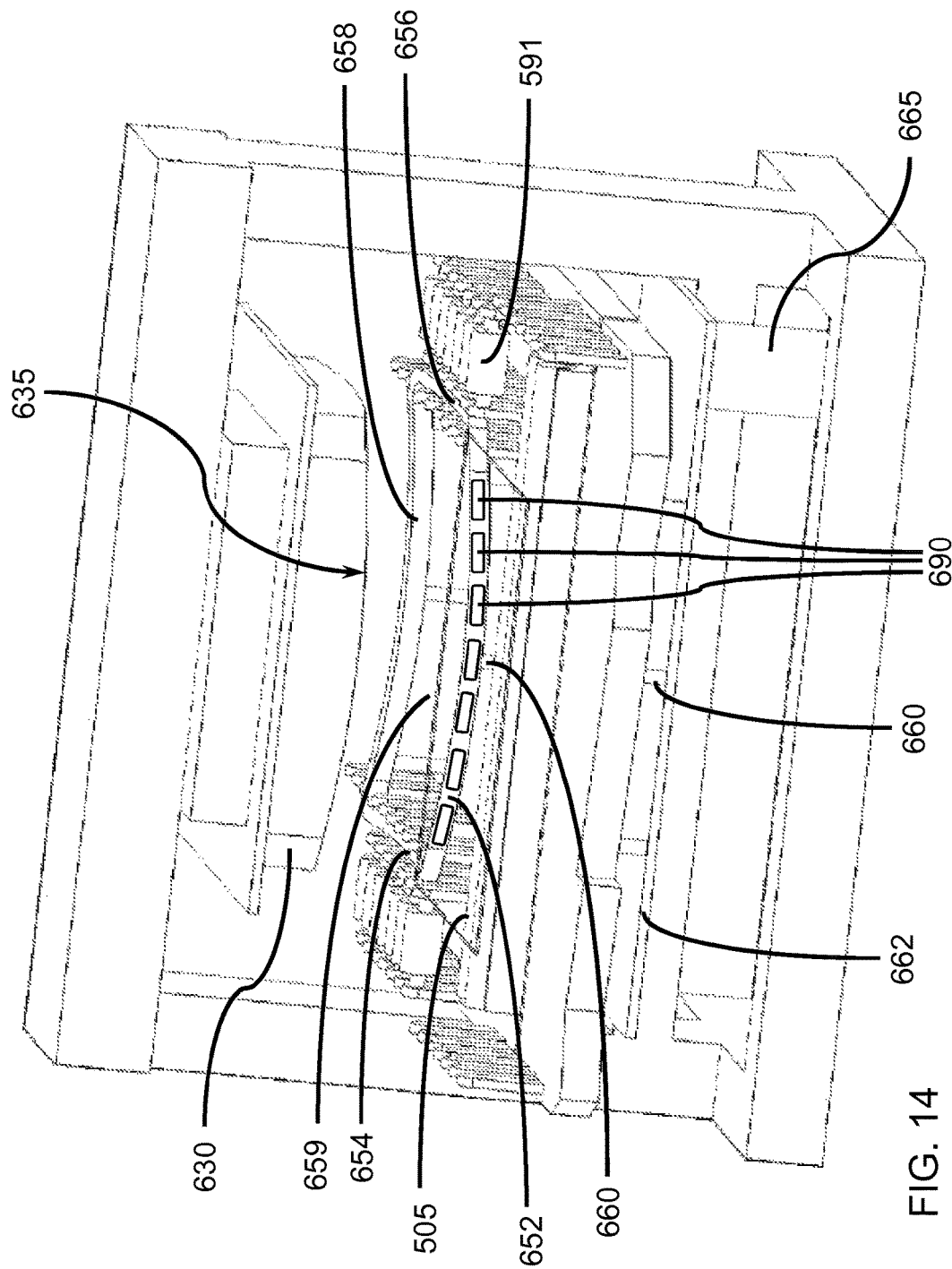
FIG. 14 illustrates a perspective view of an exemplary embodiment of a bending apparatus from an entrance side of the apparatus.

In FIG. 14, several components have not been shown for clarity and to more clearly depict aspects of the illustrated components, for example, the interior support(s) 592 have not been shown in order to more clearly show the features of the bending form structural member(s) 652, 654, 656, 658 of the female bending form 650, and the hollow space 659 into which a heated flat glass sheet would be deformed by the male bending form 630 during a forming operation.

In one or more embodiments, the female bending form 650 may provide a hollow space 659 in at least a middle or central portion of the ring configured and dimensioned to accept at least a portion of the heated glass sheet 505 and heated male bending form 630, when deformed by the heated male bending form 630.

In one or more embodiments, a ram having a continuously varying ram speed may be operatively associated with the male bending form 630, wherein the ram can move the male mold member from a fully-retracted position to a position with about 5 mm of clearance between the male bending form surface 635 and a surface of the thin glass sheet 505 with an increasing velocity, and moves the male bending form 630 from the position with about 5 mm of clearance between the contact surface of the male mold member and the surface of the thin glass sheet to a fully-extended position with a decreasing velocity to form the bent glass article, and wherein the ram reverses direction of the male bending form 630 after reaching the fully-extended position.

In one or more embodiments, the ram moves the male bending form 630 from a fully-extended position to a position with about 5 mm of clearance between the contact surface of the male bending form 630 and the supporting surface of the female bending form 650, where the bent glass article adheres to the contact surface of the male mold member due to the application of the vacuum to the interface, and breaks the vacuum to release the bent glass article.

In one or more embodiments, the thin glass article that leaves the forming zone of the bending apparatus has the final and desired shape.

Figure 15:
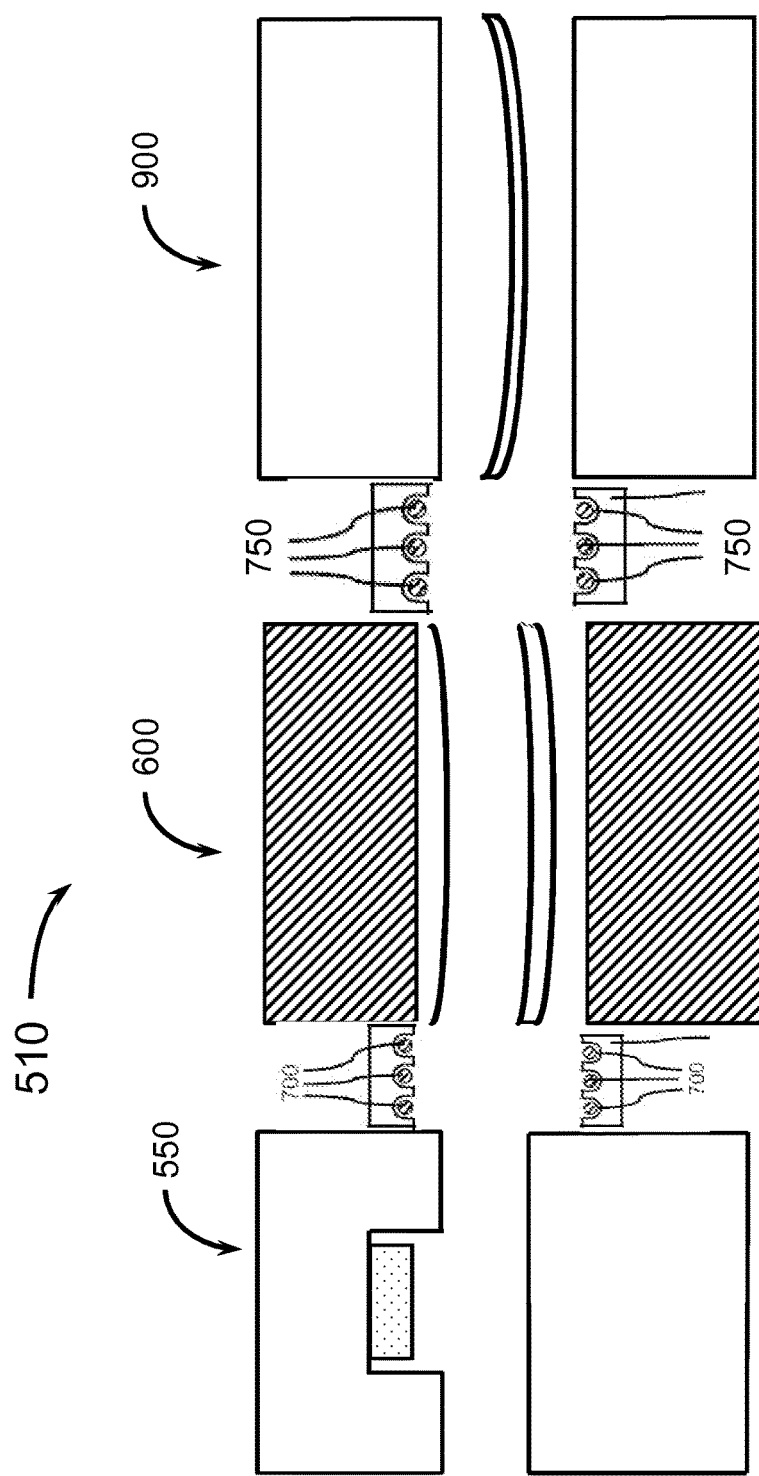
FIG. 15 illustrates a side elevational view of an apparatus for manufacturing curved glass sheets according to one or more embodiments of the disclosure.

FIG. 15 illustrates a cross-sectional view of an exemplary embodiment of a glass production system 510 including auxiliary heating elements 700 and downstream auxiliary heating elements 752. The exemplary glass production system 510 for producing curved glass may comprise a furnace 550, a bending apparatus 600 (also referred to as a bending station), and a cooling apparatus 900 (also referred to as a quench section). A glass article may be transported from the furnace 550 to the bending apparatus 600 to be shaped, and then to the cooling apparatus 900 to be cooled. Auxiliary heating elements 700 provide heat to maintain the temperature of the glass substrate as it enters the bending apparatus for a bending operation. The auxiliary heating elements may be positioned and configured as described above with respect to FIGS. 1-14. Downstream auxiliary heating elements 752 are positioned downstream from the bending apparatus and upstream from the cooling apparatus 900 or quench station. The downstream auxiliary heating elements 752 may be positioned and configured similar to the auxiliary heating elements 700. There may be a transfer zone located between the furnace 550 and bending apparatus 600, and/or between the bending apparatus 600 or bending station and cooling apparatus 900 or quench station. A transfer zone may also be located before the furnace 550 for loading glass articles into the glass production system 510, and after the cooling apparatus 900 or quench station to remove finished glass articles.

In addition to providing auxiliary heating elements in the locations described herein, according to one or more embodiments, auxiliary heating elements can be positioned at any intermediate sections where the glass can experience heat loss during transport, to maintain the glass temperature, for example to allow successful glass tempering. In one or more embodiments, the auxiliary heating elements can be located at the furnace lehr exit, above the lehr or furnace conveyor, and immediately before the entrance of the glass into the quench, above and below the transport conveyor, and at any other intermediate sections between the furnace exit and the start of the quench where the glass can experience heat loss during transport. In one embodiment, downstream auxiliary heating elements or heaters are provided between the bending or forming section and before the quench section, and in a specific embodiment, there are no additional auxiliary heating elements in the system. Placing downstream auxiliary heaters or heating elements before the quench station is useful for glass sheets in a thickness range of 0.1 mm to 2.5 mm, for example 0.1 mm to 2.4 mm, or 0.1 mm to 2.3 mm, or 0.1 to 2.2 mm, or 0.1 mm to 2.1 mm, or 0.1 to 2.0 mm, or 0.1 mm to 1.9 mm, or 0.1 to 1.8 mm, or 0.1 mm to 1.7 mm, or 0.1 to 1.6 mm, or 0.1 mm to 1.5 mm, or 0.1 to 1.4 mm, or 0.1 mm to 1.3 mm, or 0.1 to 1.2 mm, or 0.1 mm to 1.1 mm, or 0.1 to 1.0 mm, or 0.1 mm to 0.9 mm, or 0.1 to 0.8 mm, or 0.1 mm to 0.7 mm, or 0.1 to 0.6 mm, or 0.1 mm to 0.5 mm, or 0.1 to 0.4 mm. In one or more embodiments, a system of temperature sensors, for example, high temperature thermocouples can be employed to accurately control each of the auxiliary heating elements to maintain the desired glass temperature to facilitate tempering but avoid overheating which can result in objectionable optical distortions associated with glass plate overheating. As an alternative to the auxiliary heating elements, they could be replaced by an infrared reflective surface to reduce the glass heat loss between the various stations.

According to one or more embodiments, downstream auxiliary heating elements placed upstream from the quench station provide for a method to cool curved glass plates using a commercially available glass quenching systems designed to quench thicker glass plates. The downstream auxiliary heating elements 752 provide ability to quench curved glass plates significantly thinner that the conventional minimum thicknesses of 2.85 mm by minor modifications to existing equipment that have no adverse consequences. According to one or more embodiments, the apparatus and methods provide for the potential for glass optical improvements. According to conventional existing processes, in order to maintain the required glass temperature levels for tempering, especially for thinner glass plates, it is necessary to sometimes "overheat" the glass substrate. This overheating process can contribute to undesirable or unacceptable levels of optical distortion. According to one or more embodiments, thin glass plates can be heated and maintained in a temperature range to avoid overheating distortions.

A glass temperature data acquisition tool was utilized to quantify the benefit of providing a downstream auxiliary heating element 752 prior to the quench station on thin glass to exemplify the effect of the auxiliary heaters on mitigating heat loss and allowing operation at an overall lower processing temperature. Trials were run using 0.7 mm thick Gorilla® glass, which are too thin for air quenching; the trials validate the effect of the auxiliary heating elements. Two trials were run at the same line speed (250 mm/sec), furnace temperature and quench adjustments were made to attain similar part quality, evaluated by shape and optical distortion characteristics. The results of these two trials showed the effect of the auxiliary heaters essentially maintaining the glass temperature with a 4° C. loss to the start of quench cooling (and 2.5° C. of that loss was in the last 0.4 seconds, which is past the heating elements) and without the auxiliary heaters showed a temperature loss of 12° C. starting as soon as the glass is no longer in the heating area and continues to the temperature loss to the point where the quench cooling starts. These two trials also showed the ability to process glass at a lower temperature (31.6° C. cooler in this example).

The final bent glass article may have a glass thickness in the range of 0.1 mm to about 1.5 mm, or in the range of about 0.1 mm to about 1.4 mm, or in the range of about 0.1 mm to about 1.3 mm, or in the range of about 0.1 mm to about 1.2 mm, or in the range of about 0.1 mm to about 1.1 mm, or in the range of about 0.4 mm to about 1.0 mm, or in the range of about 0.1 mm to about 0.9 mm, or in the range of about 0.1 mm to about 0.8 mm, or in the range of about 0.1 mm to about 0.7 mm, or in the range of about 0.1 mm to about 0.6 mm, or in the range of about 0.1 mm to about 0.5 mm, or in the range of about 0.1 mm to about 0.4 mm.

In one or more embodiments, the glass articles may have a length and width in the range of 30.5 cm by about 30.5 cm (12 in.×12 in.) to about 50.8 cm by 101.6 cm (20 in.×40 in.), or to about 121.9 cm by 127 cm (48 in.×50 in.), or to about 127 cm by 183 cm (50 in.×72 in.). While the glass articles have been described in terms of two dimensions, it should be understood that glass articles may have various shapes, including quadrilaterals (e.g., rectangular, square, trapezoid, etc.), triangles having dimensions in two directions, for example along two different sides or axis of a plane, or may have non-rectangular shapes (e.g., circular, elliptical, oval, polygonal, etc.) that may be described in terms of a radius and/or the length of major and minor axis, where the non-rectangular shapes may be related to a rectangular shape corresponding to the two largest dimensions in perpendicular direction, for example, as it would be measured to be cut out of a rectangular sheet. The glass production system 510 and components thereof may be suitably configured and dimensioned to process glass articles of an intended size. It should be understood that the modules and components of the glass production system 510 may be scaled to accommodate larger and small glass articles.

Aspects of the present disclosure also relate to a method of shaping a glass article. Various embodiments of a method comprise feeding a flat glass sheet having two major faces and a thickness in the range of about 0.1 mm to about 1.5 mm, or about 0.1 mm to about 1.5 mm there-between with a viscosity in the range of about $1 \times 10^{9.9}$ poise to about $1 \times 10^{12.6}$ poise into a heated ring that supports at least a portion of the periphery of the flat glass sheet. A major surface of the flat glass sheet is impinged against a curved surface of a male mold form to deform the flat glass sheet into a curved glass article. The curved glass article may be transferred to a cooling ring and shuttled to another apparatus for subsequent processing.

One or more embodiments of a method involves heating a glass article in a furnace until the glass has a viscosity of about $1 \times 10^{9.9}$ poise to about $1 \times 10^{12.6}$ poise, conveying the glass article over one or more supports to a bending apparatus and exposing the glass article to a heat flux from one or more auxiliary heating elements during the transfer from the furnace to the bending apparatus. A method may further involve slowing or stopping the glass article within a forming zone of the bending apparatus, where a female bending form can engage a peripheral portion of a major surface of the heated glass article and raise the glass article off of the supports. The method may further involve contacting the major surface of the heated glass article opposite the surface in contact with the female bending form with a male bending form, and imparting the curvature of the male and female bending forms into the heated glass article, while maintaining the peripheral portion of the glass article at a viscosity of about $1 \times 10^{11.5}$ poise to about $1 \times 10^{12.6}$ poise and the central portion of the glass article at a viscosity of about $1 \times 10^{9.9}$ poise to about $1 \times 10^{11}$ poise. In various embodiments, the peripheral portion of the glass article has a viscosity of about $1 \times 10^{9.9}$ poise, and the central portion of the glass article has a viscosity of about $1 \times 10^{11}$ poise. The female bending form surface and the male bending form surface may be configured and dimensioned to have the intended shape of the bent glass article. The method may further involve retracting the female bending form from the now curved glass article while the glass article remains in contact with the surface of male bending form due to an applied vacuum, and depositing the curved glass article onto a top surface of a cooling ring. The method may further involve shuttling the curved glass article from the bending apparatus to a cooling apparatus for subsequent heat treating.

Aspects of the disclosure also relate to a method of forming a bent glass article comprising feeding a flat glass sheet having two major faces and thickness there-between with a viscosity in the range of about $1 \times 10^{9.9}$ poise to about $1 \times 10^{12.6}$ poise, or about $1 \times 10^{9.9}$ poise to about $1 \times 10^{11}$ poise into a bending apparatus, receiving the flat glass sheet in a female bending form that supports at least a portion of the periphery of the flat glass sheet, bringing at least a portion of one major face of the flat glass sheet into contact with a male bending form surface configured to come into contact with at least a portion of the flat glass sheet, wherein the female bending form and male bending form surface impart a shape into the flat glass sheet, and moving the male bending form surface past the plane of the flat glass sheet to deform the flat glass sheet into a bent glass article. The method may further comprise retracting the female bending form while the shaped glass sheet remains adhered to the male bending form surface, and moving or raising an auxiliary heater during at least a portion of a bending operation to provide clearance for a cooling ring.

Aspects of the disclosure also relate to a method of forming a bent glass article comprising feeding a flat glass sheet having two major faces and thickness there-between with a viscosity in the range of about $1 \times 10^{9.9}$ poise to about $1 \times 10^{12.6}$ poise, or about $1 \times 10^{9.9}$ poise to about $1 \times 10^{11}$ poise into a bending apparatus, receiving the flat glass sheet in a female bending form that supports at least a portion of the periphery of the flat glass sheet, raising the female bending form to bring at least a portion of one major face of the flat glass sheet into contact with a male bending form surface configured to come into contact with at least a portion of the flat glass sheet, wherein the female bending form and male bending form surface impart a shape into the flat glass sheet, retracting the female bending form while the shaped glass sheet remains adhered to the male bending form surface, and raising an auxiliary heater to provide clearance for a cooling ring, wherein the heating element drive mechanism is configured to provide at least a component of vertical movement to the one or more auxiliary heating elements. The method may further comprise heating the female bending form to a temperature sufficient to maintain the viscosity of at least a periphery of the glass article in a range of about $1 \times 10^{12.6}$ poise to about $1 \times 10^{11.5}$ poise. The method may further comprise heating the flat glass sheet supported by the heated female bending form to a temperature at which the viscosity of the glass sheet is sufficient to allow the flat glass sheet to sag prior to bringing at least a portion of the male bending form surface into contact with at least a portion of one major face of the flat glass sheet. The method may further comprise shuttling a cooling ring into a position below the male bending form surface, and depositing the shaped glass sheet onto the cooling ring.

An aspect of the present disclosure also relates to a bent glass article formed by any of the methods described herein, where the glass article has a thickness in the range of 0.1 mm to 1.5 mm.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. An apparatus for bending heated glass sheets comprising:
   a glass sheet bending station including a glass sheet receiving end, such that when the glass sheet bending station is located adjacent to an upstream furnace, the glass sheet bending station receives glass sheets conveyed from the upstream furnace, the glass sheet bending station further including a glass sheet exit end, and a bending member positioned such that when the glass sheet is conveyed into the glass sheet bending station, the glass sheet is bent, the glass sheet bending station further including an optional internal heater to impart heat to the glass sheet bending station between the receiving end and the exit end; and
   at least one auxiliary heater positioned adjacent the receiving end of the glass sheet bending station, wherein at least one of the at least one auxiliary heater is positioned above the glass sheet and is positioned to direct heat toward the glass sheet when the glass sheet exits the furnace and is conveyed into the receiving end of the glass sheet bending station.

2. The apparatus of claim 1, further comprising a furnace positioned upstream from the receiving end of the glass sheet bending station, the furnace including a furnace heat source and an exit end wall having an underside surface that faces the glass sheet when a glass sheet exits the furnace.

3. The apparatus of claim 2, further comprising a roll conveyor positioned to convey the glass sheet through the furnace and to the glass sheet receiving end of the glass sheet bending station.

4. The apparatus of claim 1, wherein the at least one auxiliary heater comprises a plurality of heating elements mounted to the receiving end of the glass sheet bending station.

5. The apparatus of claim 1, wherein the at least one auxiliary heater comprises a pair of heating elements mounted to the receiving end of the glass sheet bending station such that when a glass sheet is conveyed to the glass sheet bending station, the glass sheet is conveyed between the pair of heating elements.

6. The apparatus of claim 1, wherein the glass sheet bending station comprises a roll bender, and the bending member comprises an upper bending member and a lower bending member positioned such that when the glass sheet is conveyed into the glass sheet bending station, the glass sheet is bent between the upper bending member and the lower bending member.

7. The apparatus of claim 6, wherein the upper bending member comprises a first set of laterally spaced inclined rolls and the lower bending member comprises a second set of laterally spaced inclined rolls, wherein the glass sheet is conveyed between the first and second of laterally spaced inclined rolls.

8. The apparatus of claim 1, wherein the glass sheet bending station comprises a press bender, and the bending member comprises an upper bending member and a lower bending member positioned such that when the glass sheet is conveyed into the glass sheet bending station, the glass sheet is bent between the upper bending member and the lower bending member.

9. The apparatus of claim 1, further comprising a quench station downstream from the bending station, and a downstream auxiliary heating element positioned between the bending station and the quench station.

10. An apparatus for bending heated glass sheets comprising:
    a furnace including a conveyor to convey a glass sheet having a width through the furnace from an entrance end to an exit end; and
    a glass sheet bending station positioned downstream from the furnace, the glass sheet bending station including a glass sheet receiving end, to receive the glass sheet when the glass sheet is conveyed from the furnace, the glass sheet bending station further including a glass sheet exit end, a bending member positioned to bend the glass sheet as it is conveyed into the glass sheet bending station; and
    at least one auxiliary heater positioned adjacent the receiving end of the glass sheet bending station, wherein at least one of the at least one auxiliary heater is positioned above the glass sheet and is positioned to direct heat toward the glass sheet when the glass sheet exits the furnace and is conveyed into the receiving end of the glass sheet bending station.

11. The apparatus of claim 10, wherein the furnace comprises an enclosure including an entrance end wall and exit end wall defining a furnace interior, a furnace heat source between the entrance and exit end walls to direct heat to the furnace interior, the exit end wall having an underside surface that faces the glass sheet when a glass sheet exits the furnace.

12. The apparatus of claim 10, wherein the glass sheet bending station comprises a press bender or a roll bender, and an optional internal heater to impart heat to the bending station between the receiving end and the exit end.

13. The apparatus of claim 10, wherein the bending member comprises an upper bending member and a lower bending member, the upper bending member and lower bending member positioned to bend the glass sheet therebetween as it is conveyed into the glass sheet bending station.

* * * * *